(12) United States Patent
Umezawa et al.

(10) Patent No.: US 9,545,088 B2
(45) Date of Patent: Jan. 17, 2017

(54) FISHING REEL

(71) Applicant: GLOBERIDE, Inc., Tokyo (JP)

(72) Inventors: Yuuichi Umezawa, Tokyo (JP); Takashi Higashimoto, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 303 days.

(21) Appl. No.: 14/552,844

(22) Filed: Nov. 25, 2014

(65) Prior Publication Data

US 2015/0150229 A1 Jun. 4, 2015

(30) Foreign Application Priority Data

Nov. 29, 2013 (JP) .................................. 2013-247725
Jun. 30, 2014 (JP) .................................. 2014-134744

(51) Int. Cl.
*A01K 89/01* (2006.01)

(52) U.S. Cl.
CPC ....... *A01K 89/0187* (2015.05); *A01K 89/0117* (2013.01); *A01K 89/01912* (2015.05); *A01K 89/01918* (2015.05)

(58) Field of Classification Search
CPC ............ A01K 89/015; A01K 89/01912; A01K 89/019125; A01K 89/01915; A01K 89/053
See application file for complete search history.

(56) References Cited

U.S. PATENT DOCUMENTS

| | | | | |
|---|---|---|---|---|
| 2,160,175 A | * | 5/1939 | Shakespeare, Jr. | A01K 89/015 242/279 |
| 2,652,212 A | * | 9/1953 | Holahan, Jr. | A01K 89/015 140/3 R |
| 3,237,900 A | * | 3/1966 | Odom | A01K 89/015 242/157 R |
| 6,053,444 A | * | 4/2000 | Yamaguchi | A01K 89/015 242/275 |
| 8,714,470 B2 | * | 5/2014 | Toma | A01K 89/015 242/273 |

(Continued)

FOREIGN PATENT DOCUMENTS

| | | |
|---|---|---|
| CN | 1193455 | 9/1998 |
| JP | 2012070683 | 4/2012 |
| JP | 2013243997 | 9/2013 |

OTHER PUBLICATIONS

Chinese Office Action dated Aug. 1, 2016 for Appln. No. 201410708795.1.

*Primary Examiner* — Emmanuel M Marcelo
(74) *Attorney, Agent, or Firm* — Pillsbury Winthrop Shaw Pittman, LLP

(57) ABSTRACT

Provided is a fishing reel in which damage of a fishing line at the time of drawing out of the fishing line against a drag force can be prevented, and moreover a load on a level wind device can be reduced. Consequently it is possible to improve engagement and sensitivity of the fishing line, and operability of the fishing reel. More specifically, the fishing reel includes a level wind device causing a fishing line guide to reciprocate in a left-right direction to guide a fishing line to the spool, and a drag device imparting a drag force on the fishing line. The fishing line guide includes a narrow guide portion and a wide opening, the fishing line is situated in the narrow guide portion when the fishing line is wound around the spool, and situated in the wide opening when the fishing line is released from the spool.

9 Claims, 41 Drawing Sheets

(56) References Cited

U.S. PATENT DOCUMENTS

2013/0193250 A1* 8/2013 Ikebukuro ............ A01K 89/015
242/261
2014/0183292 A1 7/2014 Kaneko et al.

* cited by examiner

FISHING REEL

CROSS-REFERENCE TO RELATED APPLICATIONS

This application is based on and claims the benefit of priority from Japanese Patent Application Serial No. 2013-247725 (filed on Nov. 29, 2013) and Japanese Patent Application Serial No. 2014-134744 (filed on Jun. 30, 2014), the contents of which are hereby incorporated by reference in their entirety.

TECHNICAL FIELD

The present disclosure relates to a fishing reel in which a fishing line guide is disposed between side panels in front of a spool.

BACKGROUND

A conventional double-bearing type fishing reel includes a level wind device for uniformly winding a fishing line around a spool which is rotatably supported between left and right side panels. The level wind device may include a fishing line guide configured to reciprocate in a left-right direction in front of the spool in accordance with operation of a handle provided rotatably close to one of the side plates for winding a fishing line. The fishing line is admitted through the fishing line guide and thereby the fishing line can be wound around the spool in parallel.

When casting a fishing tackle, a fishing line contacts the above-described fishing line guide, causing a resistive force which may undesirably reduce a casting distance of the fishing tackle. To address this problem, Japanese Patent Application Publication No. 2012-70683 (the "'683 Publication") discloses a fishing line guide having an upper portion that is longer in a left-right direction and serves as an insertion portion for the fishing line at the time of releasing and a lower portion that has a groove in a narrowed center region serving as a guide for winding the fishing line. The '683 Publication also discloses a pillar that is disposed near the fishing line guide in a front-rear direction and that is movable up and down in accordance with switching operation of a clutch. The pillar may be moved up when a fishing line is released, and moved down when the fishing line is wound. Because the pillar has moved to the upper position, the fishing line is situated at the fishing line insertion portion and the resistive force on the fishing line at the time of releasing can be reduced. In addition, when the pillar is moved to the lower position, the fishing line is guided to the narrow groove and winding of the fishing line around the spool can be improved.

In addition, Japanese Patent Application Publication No. 2013-243997 discloses a fishing reel in which a fishing line guide is rotated in accordance with a switching operation of a clutch. In this fishing reel, the fishing line guide is configured to rotate to move toward the front side to let the fishing line situate at the insertion portion when the fishing line is released, and the resistive force on the fishing line can be reduced. Moreover, when the fishing line is wound, the fishing line guide of the fishing reel is configured to rotate to move toward the rear side to let the fishing line situate at the groove while a rear portion of an upper end of the guide hold down the fishing line, and the fishing line goes through the groove to be wound.

SUMMARY

Fishing reels usually have a drag device which cause a breaking force (hereunder referred to as a "drag force") on a fishing line when the fishing line is drawn out due to fish bites and the like. When the fishing line is pull out against the drag force generated by the drag device, the fishing line is drawn out through a groove so there is friction between the groove and the fishing line. The friction could damage the fishing line. Moreover, when the fishing line is a PE line, coating could be lost due to the friction. In addition, a load is imposed on the level wind device through a fishing line guide and it could cause a failure.

The drag force may vary depending on a position of the fish line guide in a left-right direction, this may affects engagement of the fishing line, moreover sensitivity and operability of the fishing line could be affected so there are demands for addressing this problem.

The present disclosure is intended to overcome the above problems. An object of the present disclosure is to provide a fishing reel in which damage of a fishing line at the time of drawing out of the fishing line against a drag force can be prevented, and moreover a load on a level wind device can be reduced. Consequently it is possible to improve engagement and sensitivity of the fishing line, and operability of the fishing reel.

To this end, a fishing reel according to the present disclosure includes a spool rotatably supported by a reel body, a fishing line guide through which a fishing line is inserted, a level wind device causing the fishing line guide to reciprocate in a left-right direction to guide the fishing line to the spool, and a drag device imparting a drag force on the fishing line. The fishing line guide includes a narrow guide portion and a wide opening, the fishing line is situated in the narrow guide portion when the fishing line is wound around the spool, and the fishing line is situated in the wide opening when the fishing line is released from the spool. The fishing reel further includes a switch mechanism for switching attitude of the fishing line guide. The attitude of the fishing line guide is switched by the switch mechanism in such a way that a position where the fishing line is guided is changed from the narrow guide portion to the wide opening when the fishing line is drawn out against the drag force of the drag device at the time of winding of the fishing line around the spool.

In the fishing reel according to the disclosure, the fishing line is situated in the narrow guide portion when the fishing line is wound around the spool and the fishing line is uniformly wound around the spool through the narrow guide portion. When the fishing line is drawn out against the drag force in the fishing line winding state, the fishing line is situated in the wide opening and the fishing line is draw out through the wide opening.

In the fishing reel according to the disclosure, when the fishing line is wound around the spool in other words in the fishing line winding state, the fishing line is situated in the narrow guide portion and the fishing line is uniformly wound around the spool through the narrow guide portion so that the fishing line can be adequately wound in parallel around the spool. When the fishing line is drawn out against the drag force in the fishing line winding state, the fishing line is situated in the wide opening and the fishing line is draw out through the wide opening, thereby the resistive force acting on the fishing line drawn out can be reduced. Therefore, the fishing line tends to be less damaged compared to the fishing line drawn out through the narrow guide portion. Moreover, it is possible to reduce the load on the level wide device due to the drawing out of the fishing line. Because the resistive force acting on the drawing out of the fishing line is reduced, variations in the drag force is less likely to occur and therefore it is possible to prevent defects including degradation of dragging performance and the like. Thus, a desired dragging performance can be obtained and consequently it is possible to enhance engagement and sensitivity of the fishing line, and operability of the fishing reel.

Moreover, when at least a part of the switch mechanism is disposed in a space between a drive shaft of the level wind device and a rotator of the drag device, it is possible to reduce the size of the fishing reel.

Moreover, when the switch mechanism includes the one-way device and the friction device that are coupled to each other within the one of the side panels, the drive mechanism for driving the fishing line guide is concentrated and it is possible to further simplify the structure and reduce the size of the drive mechanism. Moreover, it is possible to transmit the rotational force of the one-way device effectively to the friction device and to stabilize the rotational movement.

Furthermore, when the one-way device and the friction device are disposed on the handle shaft, the drive mechanism is concentrated on the handle shaft and it is possible to further simplify the structure and reduce the size of the drive mechanism. Because the drive mechanism is concentrated on the handle shaft, interferences with other components can be adequately avoided. Moreover, it is possible to improve the arrangements of the components.

In addition, when the fishing line guide is switchable by switching the clutch mechanism, adequate winding and releasing of the fishing line in conjunction with the switching of the clutch mechanism can be realized. As a result, it is possible to obtain a fishing reel with an excellent operability.

BRIEF DESCRIPTION OF DRAWINGS

FIG. 7b is an elevation view of the fishing line guide of FIG. 7a.

FIG. 9b is an elevation view of the fishing line guide of FIG. 9a.

DESCRIPTION OF THE PREFERRED EMBODIMENTS

Embodiments of a fishing reel according to the present disclosure will be now described with reference to the drawings. As used herein, "front and rear" and "left and right" directions refer to the directions shown in FIG. 1, and "upper and lower" directions refer to the direction shown in FIGS. 3 and 4. The same elements are denoted with the same numeral and free of duplicate description.

First Embodiment

Figure 1:
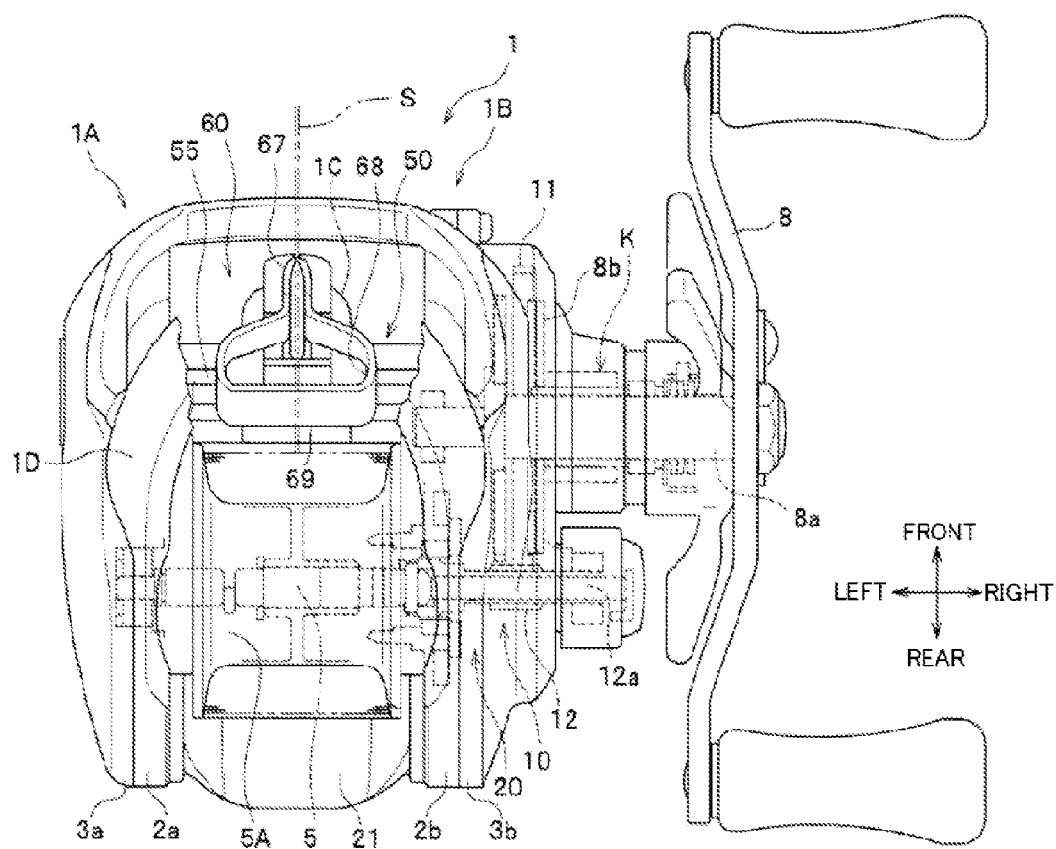
FIG. 1 is a plan view of a fishing reel according to a first embodiment of the disclosure, exposing a fishing line guide portion.

Referring to FIG. 1, a fishing reel according to the first embodiment may include a reel body 1 having left and right side plates 1A, 1B. The left and right side plates 1A, 1B may include left and right frames 2a, 2b which are covered with left and right covers 3a, 3b, respectively. The reel body 1 may be integrated with a reel leg 1C that is situated between the left and right side plates 1A, 1B and mounted on a fishing rod (not shown). Between the left and right frames 2a, 2b, a spool shaft 5 may be rotatably supported via a bearing. The spool shaft 5 may integrally carry a spool 5A around which a fishing line S is to be wound. A thumb rest 1D on which fingers can be placed may be provided between the left and right side plates 1A, 1B over the spool 5A.

In this embodiment, a handle 8 that rotates the spool 5A may be provided closer to the right side plate 1B. A space may be provided between the right frame 2b and the right cover 3b, and a well-known drive force transmission mechanism 10 may be disposed therein. The drive force transmission mechanism 10 transmits a rotational drive force of the handle 8 to the spool shaft 5. Between the right frame 2b and the right cover 3b, a well-known clutch mechanism 20 may be further disposed. The clutch mechanism 20 switches the spool shaft 5 between a force transmitting state and an idle state. The clutch mechanism 20 can be switched from a clutch-On state (the force transmitting state and a fishing line winding state) to a clutch-Off state (the idle state and a fishing line releasing state) by pressing down a clutch switch operation member 21 (hereunder referred to as an operation member) disposed between the left and right side plates 1A, 1B behind the spool 5A. Returning from the clutch-Off state to the clutch-On state can be performed via a well-known automatic return mechanism 30 (see FIG. 3) by rotating the handle 8, which will be described later in detail.

Figure 2:
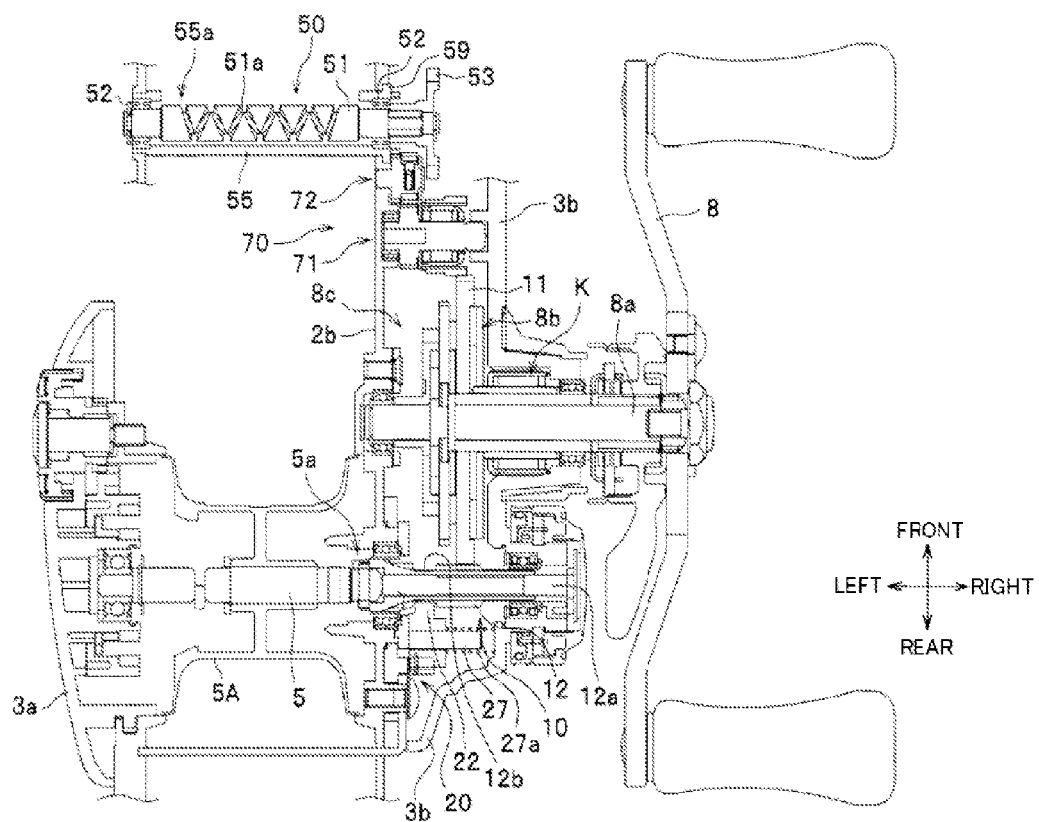
FIG. 2 illustrates an internal structure of the fishing reel of FIG. 1.
Figure 3:
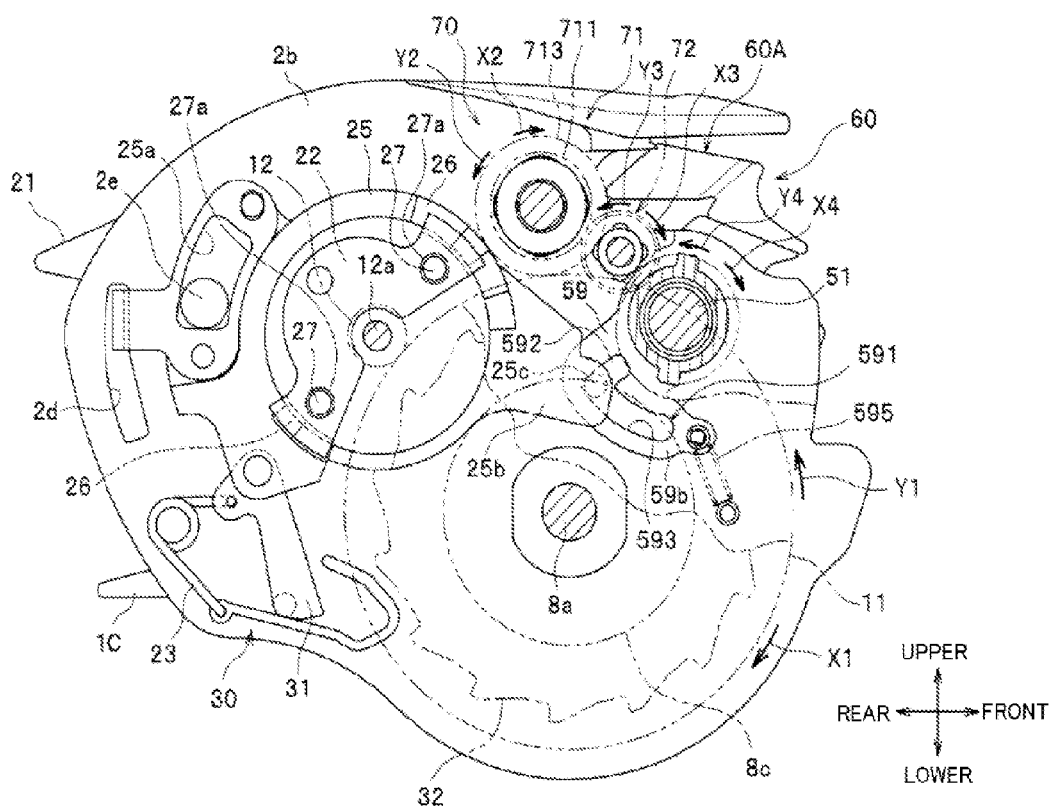
FIG. 3 is a side view of the fishing reel of FIG. 1 showing a force transmission portion of a clutch mechanism (clutch-On state).
Figure 4:
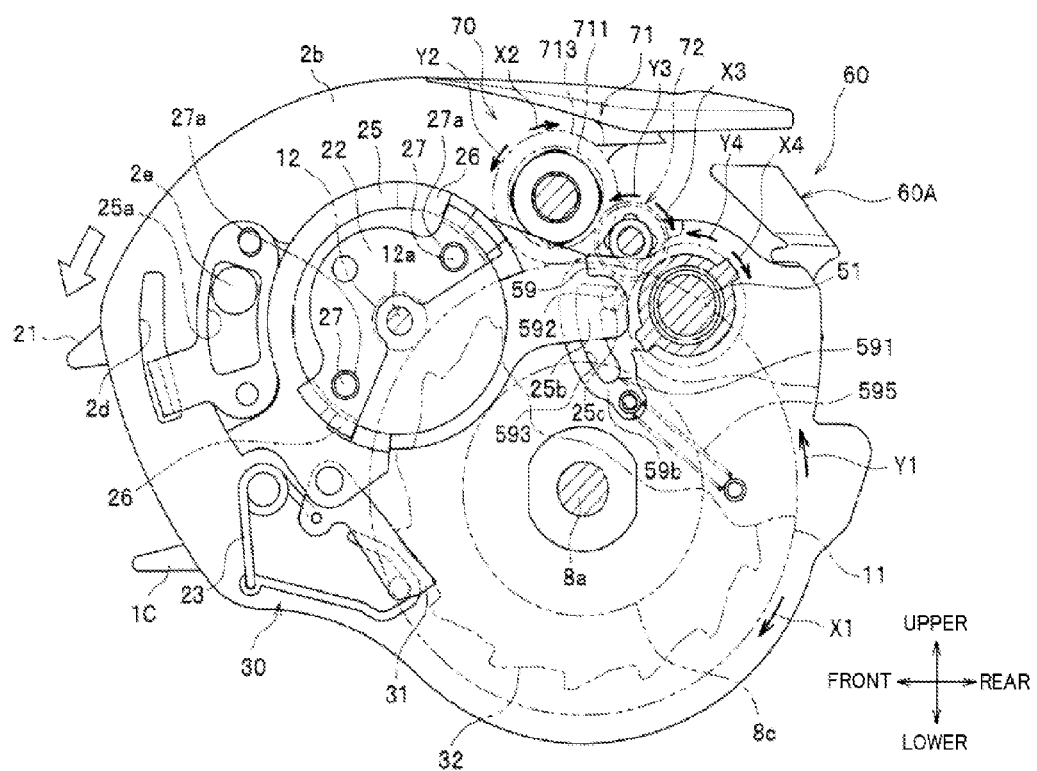
FIG. 4 is a side view of the fishing reel of FIG. 1 showing the force transmission portion of the clutch mechanism (clutch-Off state).

A switch mechanism 70 may be further provided between the right frame 2b and the right cover 3b as illustrated in FIGS. 2, 3, and 4. The switch mechanism 70 switches the attitude of a fishing line guide 60 (FIGS. 1, 3, and 4) by rotating the guide when the fishing line S is drawn out against a drag force generated by a hereunder-described drag device 8b (see FIG. 2) in a fishing-line winding state. Details of the switch mechanism 70 will be described later.

Referring to FIG. 1, a level wind device 50 may be provided between the left and right side plates 1A, 1B on a side (the front side) where the fishing line is released from the spool 5A. The level wind device 50 may include the fishing line guide 60 through which the fishing line S is inserted. The fishing line guide 60 is configured to be reciprocated in the left-right direction by rotational operation of the handle 8, and causes the fishing line to be evenly wound around the spool 5A in accordance with the winding operation of the fishing line S.

The drive force transmission mechanism 10 may include a drive gear 11 and a pinion 12 meshing with the drive gear 11. The drive gear 11 is a rotator rotatably supported by a handle shaft 8a to which the handle 8 is fixed via the drag device 8b. When the handle 8 is rotated for winding the fishing line, the drive gear 11 is rotated in the direction (clockwise) indicated by the arrow X1 shown in FIG. 3. When the fishing line S is drawn out against the drag force generated by the drag device 8b, the drive gear 11 rotates in the direction (counterclockwise) indicated by the arrow Y1 shown in FIG. 3. The handle shaft 8a has an one-way clutch K (a rolling one-way clutch that utilizes an wedge effect) disposed between the right cover 3b and the handle shaft 8a to allow the rotation in a direction in which the fishing line is wound and to provide a backstop mechanism which prevents reverse rotation at the time of releasing of the fishing line.

Referring to FIG. 2, the pinion 12 is disposed coaxially with the spool shaft 5 and is configured to be movable along the pinion shaft 12a (or spool shaft 5). The pinion 12 may have a circumferential groove 12b on the circumferential surface, and a yoke 22 of the clutch mechanism 20 is engaged in the circumferential groove 12b to move the pinion 12 in the axial direction, which will be described later. More specifically, the pinion 12 is moved in the axial direction to be coupled to or removed from the spool shaft 5, which switches the state between the force transmission (clutch-On) state and the idle (clutch-Off) state.

Referring to FIG. 3, the clutch mechanism 20 may have a clutch plate 25 supported rotatably with respect to the right frame 2b. The clutch plate 25 is supported by a switch spring 23 that switches the state of the clutch plate 25 between the force transmission state (clutch-On state) illustrated in FIG. 3 and the idle state (clutch-Off state) illustrated in FIG. 4. The clutch plate 25 is coupled to the operation member 21 through a joint opening 2d that is formed in the upper-lower direction in the right frame 2b. A pin 2e is provided on the right frame 2b so as to protrude therefrom and inserted into a long opening 25a in the clutch plate 25. The rotation of the clutch plate 25 is guided with the pin 2e.

On the surface of the clutch plate 25, a pair of cam surfaces 26 may be formed. The pair of cam surfaces 26 is engagable with the yoke 22 engaged in the circumferential groove 12b of the pinion 12. A tip portion of the yoke 22 is held by a support pin 27 that is disposed on the right frame 2b so as to protrude out from the right frame. The yoke 22 is always biased toward the spool shaft 5 by a spring member 27a disposed on the support pin 27. FIG. 3 shows the state where the yoke 22 is biased toward the spool shaft 5 by the spring member and the pinion 12 is fitted in an engagement portion 5a (see FIG. 2) formed on an end portion of the spool shaft 5.

The clutch plate 25 rotates counterclockwise when the operation member 21 is pressed down as indicated by the outline arrow shown in FIG. 4. When the clutch plate 25 rotates, it moves the pinion 12 (see FIG. 2) to the right direction via the cam surfaces 26 and the yoke 22 against the bias of the spring member 27a. The clutch plate 25 is then detached from an engaging portion 5a (see FIG. 2) formed at the edge of the spool shaft 5 and is switched to the clutch-Off state. This state is retained by the switch spring 23.

The clutch plate 25 may be provided with the automatic return mechanism 30 turning the clutch from the Off state to the On state. The automatic return mechanism 30 may include a kick member 31 coupled with the clutch plate 25 so as to be swingable, and a ratchet 32 unrotatably secured to the handle shaft 8a. When the state changed from the clutch-On state to the clutch-Off state, the kick member 31 is placed in a rotational track of the ratchet 32 as shown in FIG. 4. Therefore when the handle 8 is operated for winding in the clutch-Off state, the kick member 31 is kicked up by the rotation of the ratchet 32 and the kick member 31 is moved upward to return the clutch plate 25 to the clutch-On state automatically (by rotating the clutch plate 25 clockwise). This state is retained by a force generated by the switch spring 23 Returning of the clutch can be also performed by pushing up the operation member 21.

As described above, the level wind device 50 may be provided between the left and right side plates 1A, 1B on the front side with respect to the spool 5A. Configuration of the level wind device 50 will be now described with reference to FIGS. 5 to 9.

The level wind device 50 includes the fishing line guide 60 through which the fishing line S wound around the spool 5A is inserted. The fishing line guide 60 is rotatably supported between the left and right plates 1A, 1B via the bearing 52 (see FIGS. 2 and 5a) and is configured to reciprocate in the left-right direction by a warm shaft 51 rotatably driven via the drive force transmission mechanism 10. An input gear 53 is provided on the side of the warm shaft 51 closer to the right frame 2b and adjacent to the drive gear 11. The input gear 53 is meshed with a coupling gear 8c (see FIG. 3) that rotates integrally with the handle shaft 8a (the input gear 53 and the coupling gear 8c are shown as they are separated in FIG. 2). The warm shaft 51 is rotated in synchronization with the rotation of the handle 8 via the coupling gear 8c and the input gear 53.

The warm shaft 51 is housed in a tubular body (cylinder) 55 rotatably supported between the left and right side plates 1A, 1B as shown in FIG. 2. On an outer surface of the tubular body 55, a long opening 55a extending in an axial direction (see FIG. 7b) is formed. The long opening 55a partially exposes a spiral groove 51a formed on a surface of the warm shaft 51 along the axial direction.

Figure 6:
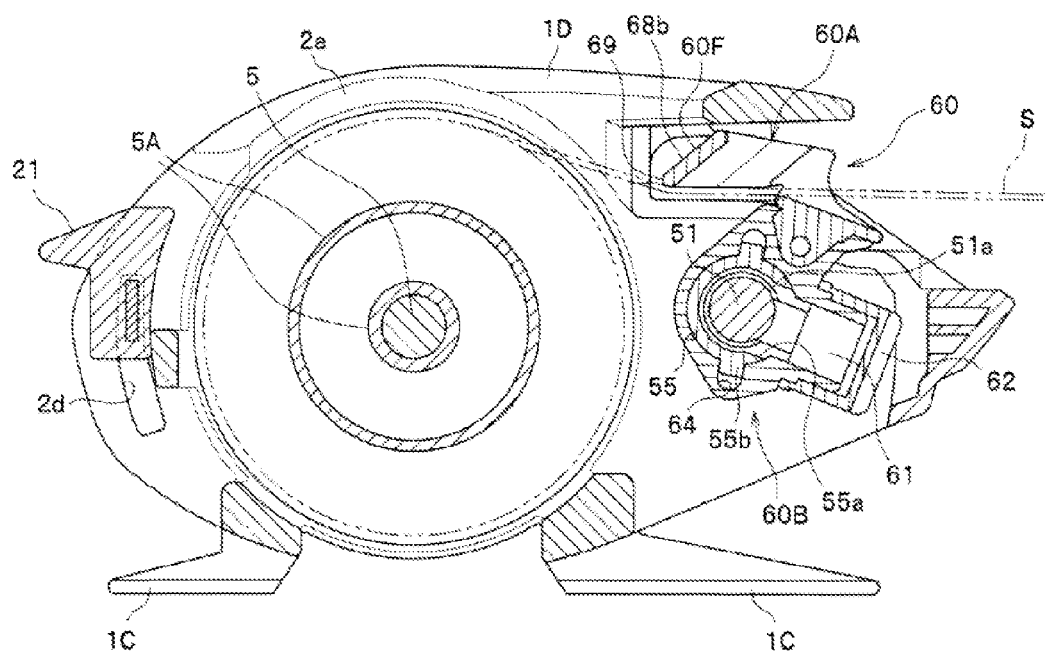
FIG. 6 is a longitudinal sectional view of the fishing reel of FIG. 1 illustrating a fishing line winding state (clutch-On state) of the fishing line guide.
Figure 7A:
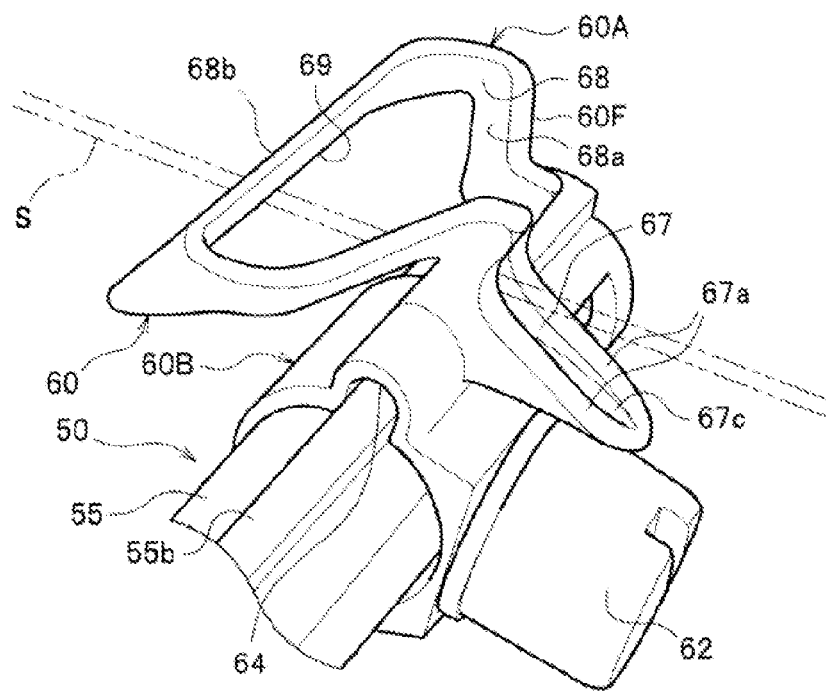
FIG. 7a is an enlarged perspective view of the fishing line guide (clutch-On state).

Referring to FIGS. 6, 7(a), and others, the fishing line guide 60 may include a fishing line insertion portion 60A and a retainer 60B integrated thereon. The retainer 60B may surround the tubular body 55. The retainer 60B may include a slider 61 therein. The slider 61 may be engaged with the spiral groove 51a through the long opening 55a. The slider 61 may be fixed to the retainer 60B with a cap nut 62. Because the slider 61 is engaged with the spiral groove 51a, the fishing line guide 60 is moved along the axial direction by rotation of the warm shaft 51 but it is configured to be unrotatable about the tubular body 55. In this embodiment, detents 55b extending along the axial direction and protruding out from the periphery of the tubular body 55 are formed. The fishing line guide 60 is unrotatably attached with respect to the tubular body by engaging engagement portions 64 of the retainer 60B with the detents 55b. More specifically, the detents 55b are formed as protrusions that protrude out from the periphery of the tubular body 55 in the axial direction (see FIGS. 6 and 7b, a pair of the protrusions is provided with an interval of 180 degrees therebetween), and the engagement portions 64 are formed as concave portions in which the protrusions are engaged (see FIG. 6).

The fishing line guide 60 is driven to reciprocate via the slider 61 in the left-right direction between the left and right side plates 1A, 1B when the warm shaft 51 is rotated, and the guide is switched between the fishing line winding state and the fishing line releasing state in accordance with On/Off of the clutch mechanism 20. In this embodiment, the rotation of the fishing line guide 60 is generated by the rotation of the tubular body 55.

The force transmission path from the clutch mechanism 20 to the tubular body 55 will be now described in detail. Referring to FIG. 3, the clutch plate 25 may have a projection 25b projecting toward the front side of the reel body 1. An engaging projection 25c may be formed integrally at an end of the projection 25b. The engaging projection 25c projects toward the right frame 2b. A rotation plate 59 may be retained in a portion where the warm shaft 51 is supported in the right frame 2b The tubular body 55 (see FIG. 6) is unrotatably fixed to the rotation plate 59 on the inner face side of the right frame 2b. The rotation plate 59 has a convex portion (not shown) that protrudes radially outward, and this convex portion is engaged with a concave portion (not shown) formed at an end (inner circumference) of the tubular body 55 so that the rotation plate 59 and the tubular body 55 are fixed (rotatable as a single unit) on the inner surface side of the right frame 2b. Alternatively, the rotation plate 59 and the tubular body 55 may be formed integrally.

Figure 5A:
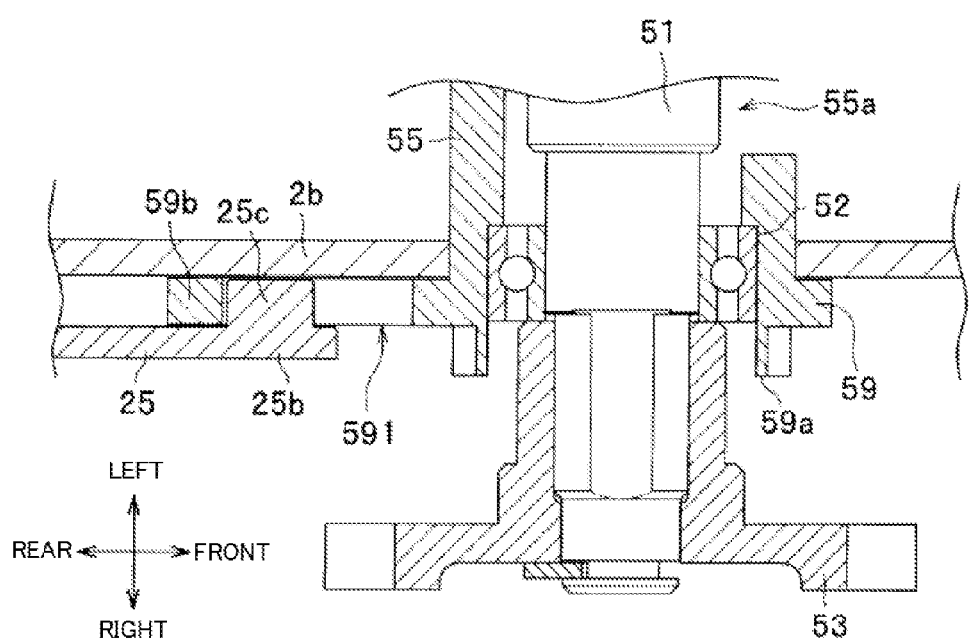
FIG. 5a is a sectional view showing a coupling portion between a clutch plate and a rotation plate rotating a fishing line guide.

Referring to FIG. 5a, the rotation plate 59 may be rotatably supported between the right frame 2b and an outer ring of the bearing 52 that rotatably supports the warm shaft 51. The rotation plate 59 may have a coupling portion 59b along the outer surface of the right frame 2b. The coupling portion 59b is disposed to overlap with the projection 25b of the clutch plate 25 in the left-right direction. Referring to FIG. 3, an engagement opening 591 having an L-shape as viewed from the lateral may be provided in the coupling portion 59b. The engagement opening 591 may include a first long opening 592 and a second long opening 593 that is formed continuously with the first long opening 592. The first long opening 592 extends in the radial direction of the warm shaft 51, and the second long opening 593 is formed in a circular arc shape concentric with the warm shaft 51.

The engaging projection 25c of the projection 25b of the clutch plate 25 is loosely inserted in the engagement opening 591. In this manner, the rotation plate 59 is rotated on the axial center of the warm shaft 51 in accordance with the rotation of the clutch plate 25 as shown in FIGS. 3 and 4. Thus, together with the clutch plate 25 switched between the fishing line winding state and the fishing line releasing state by the switch spring 23, the rotation plate 59 is also shifted between two positions. The second long opening 593 of the engagement opening 591 also serves as one of the components of the switch mechanism 70, which will be hereunder described.

A return spring 595 may be provided between a lower end of the coupling portion 59b and the right frame 2b. The return spring 595 biases the rotation plate 59 in a counterclockwise direction and retains the rotation plate 59 in the fishing line winding state. In this manner, in the fishing line winding state, the engaging projection 25c of the clutch plate 25 is retained in the rear end of the first long opening 592 (the upper end of the second long opening 593) in the engagement opening 591 of the rotation plate 59 as shown in FIG. 3. Moreover, in the fishing line releasing state, the engaging projection 25c is retained in the front end of the first long opening 592. The return spring 595 may also serve as one of the components of the switching mechanism 70, which will be hereunder described.

The fishing line guide 60 is reciprocated in the front-rear direction in front of the spool 5A when the tubular body 55 is rotated via the rotation plate 59. The fishing line insertion portion 60A of the fishing line guide 60 will be now described in detail with reference to FIGS. 7 and 9.

Figure 9A:
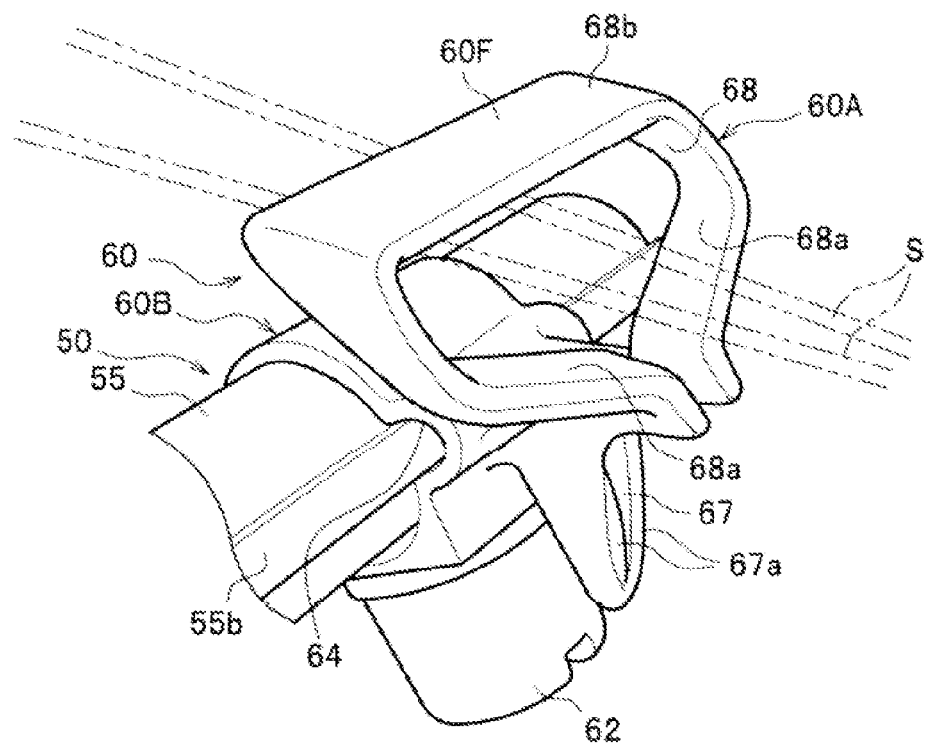
FIG. 9a is an enlarged perspective view of the fishing line guide (clutch-Off state).
Figure 9B:
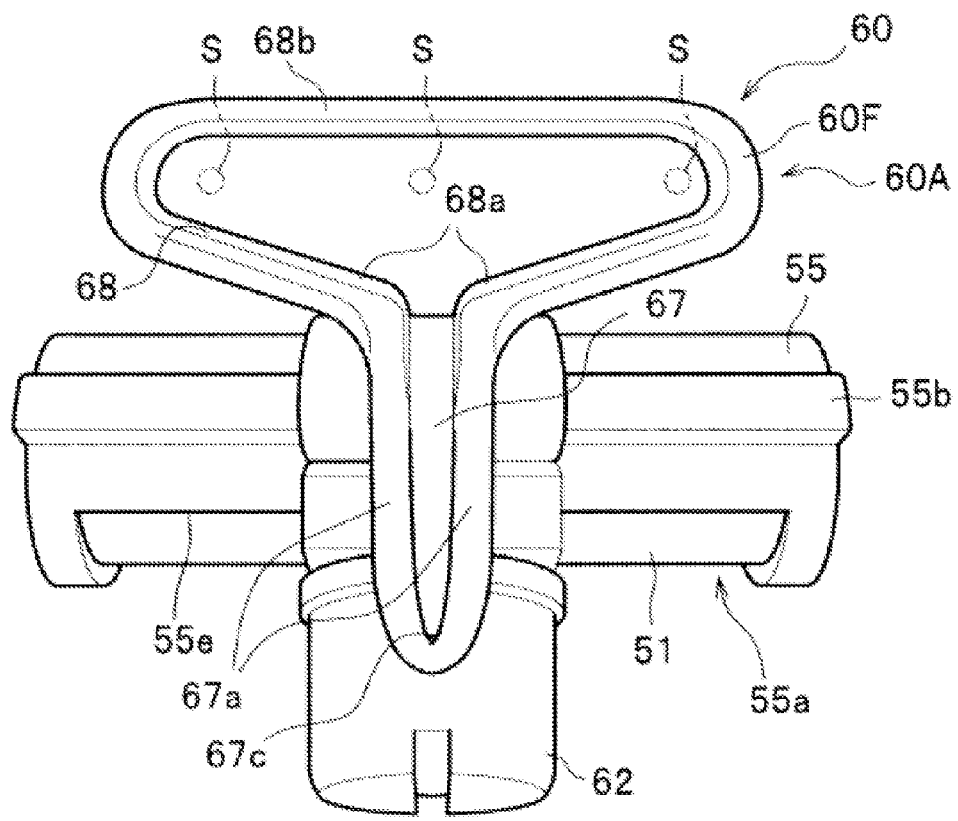

The fishing line insertion portion 60A is a portion through which the fishing line S from the spool 5A is inserted. The insertion portion 60A is formed as a frame body 60F formed integrally with the retainer 60B and made of a low resistive material for the fishing line such as SUS and titanium. More specifically, the fishing line insertion portion 60A may include a narrow fishing line guide portion 67 that has a shorter width (narrow groove) in the left-right direction, and a wide opening 68 that extends symmetrically in the left-right direction above the narrow fishing line guide portion 67. Referring to FIG. 9b, the wide opening 68 may be formed in a substantially oblong shape extending in the left-right direction as viewed from the front (an anterior view along the fishing line S inserted therethrough) in the fishing line releasing state. Side walls of the wide opening 68 may have sloping guide surfaces 68a that slope toward the narrow guide portion 67 substantially below the center of the wide opening 68 for guiding the fishing line S.

The frame body 60F having the wide opening 68 is slanted in the front-rear direction (stands up gradually toward the rear side) as viewed from the lateral (see FIG. 6) in the fishing line winding state. An upper wall 68b defining the wide opening 68 extends in the front-rear direction (see FIG. 8) in the fishing line releasing state so as to secure an opening as large as possible. Thus, a rear edge 69 of the upper wall 68b is rotated and positioned to touch the fishing line S inserted in the wide opening 68 from above when it is switched from the fishing line releasing state to the fishing line winding state, and serves as a control portion for restricting the movement of the fishing line S (hereunder, the rear edge is referred to as a control portion 69).

Figure 7B:
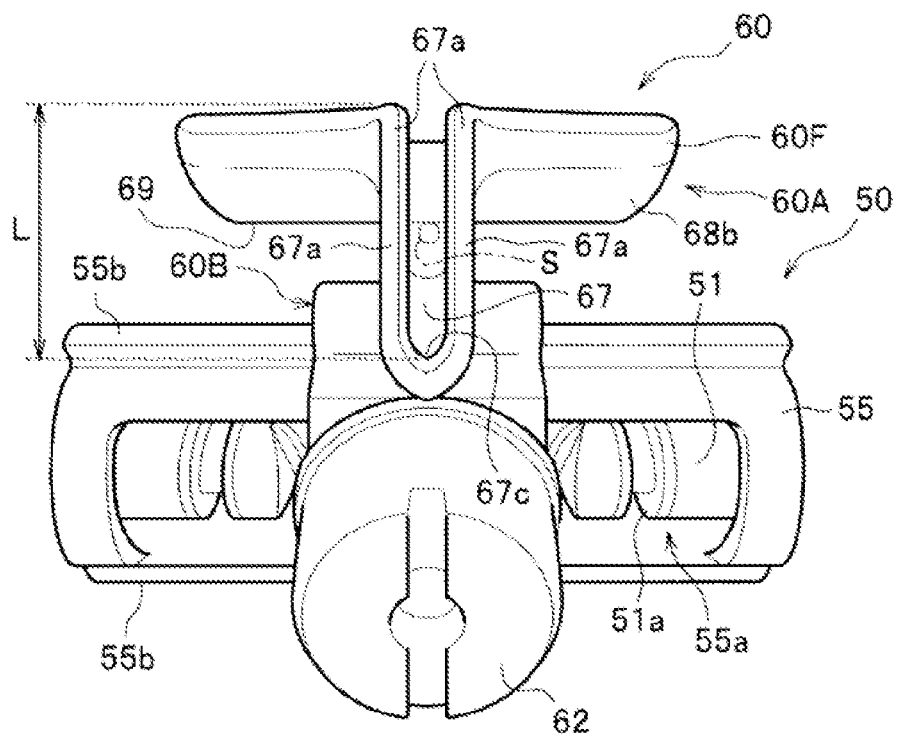
Figure 8:
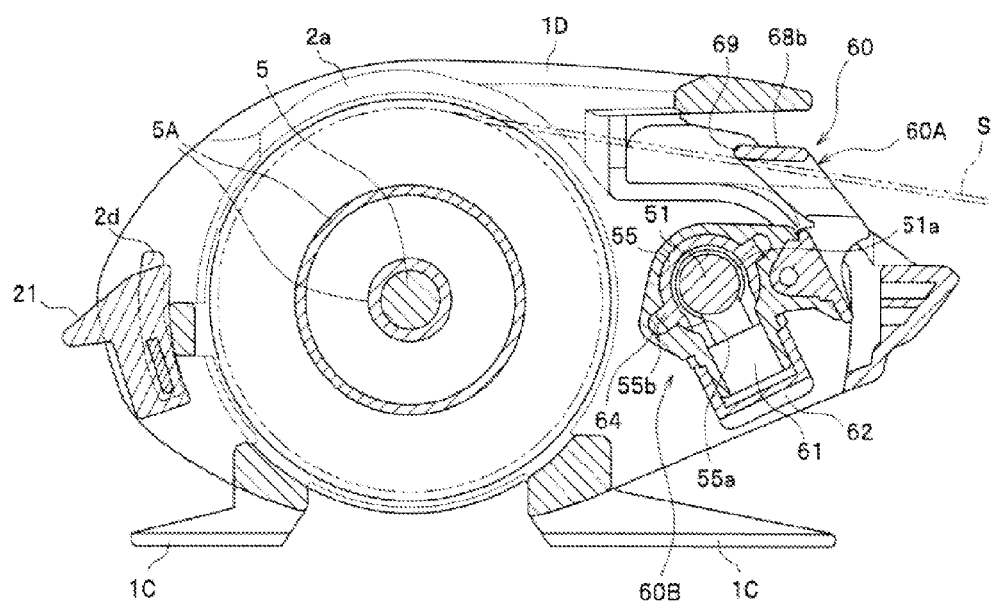
FIG. 8 is a longitudinal sectional view of the fishing reel of FIG. 1 illustrating a fishing-line releasing state (clutch-Off state) of the fishing line guide.

The control portion 69 is integrally formed with the frame body 60F. When the fishing line guide 60 has been rotated from the fishing line releasing state to the fishing line winding state in accordance with the clutch mechanism 20, the control portion 67 is configured to be positioned within a range L in the longitudinal direction of the narrow guide portion 67 as viewed from the front (an anterior view along the fishing line S as shown in FIG. 7b). Because the control portion 69 is configured to be placed such position, when the fishing line guide 60 is rotated from the fishing line releasing state to the fishing line winding state, the fishing line S situated at any position within the wide opening 68 is pressed down by the control portion 69 and securely guided along the sloping guide surface 68a to the narrow guide portion 67. In addition, with such configuration of the control portion, it is possible to prevent disengagement of the fishing line S from the narrow guide portion 67 in the fishing line winding state.

The narrow guide portion 67 extends in the upper-lower direction and prevents the fishing line S from shifting in the left-right direction in the narrow guide portion. Thus, the narrow guide portion 67 provides a stable parallel winding of the fishing line around the spool 5A (see FIG. 1) (a feature to improve the winded state).

Referring to FIGS. 7a and 7b, it is preferable that walls 67a defining the narrow guide portion 67 extend over the cap nut 62 that fixes the slider 61 (see FIG. 6) so that it is possible to effectively prevent the fishing line S in the narrow guide portion 67 form being tangled around the cap nut 62. It is preferable that a bottom surface 67c of the narrow guide portion 67 be sloped down gradually toward the front side as viewed in the fishing line winding state shown in FIG. 6. Because the bottom surface is sloped down in this manner, it is possible to reduce a frictional resistance between the bottom surface and the inclined fishing line released from the spool.

The switch mechanism 70 will be now described. As described above, the switch mechanism 70 rotates the fishing line guide 60 (see FIGS. 1, 3, and 4) when the fishing line S is drawn out against a drag force generated by the drag device 8b (see FIG. 2). Referring to FIGS. 3 and 4, the switch mechanism 70 may include a one-way gear 71 which is an one-way device, a friction gear 72 which is a friction device, the engagement opening 591 which is a position control means, and the return spring 595 which is a return means. The position control means may include any configurations such as cams and concave grooves instead of the engagement opening described in the following embodiment, and the return means may include any springs such as a leaf spring or any elastic body instead of the spring described in the following embodiment.

Figure 5B:
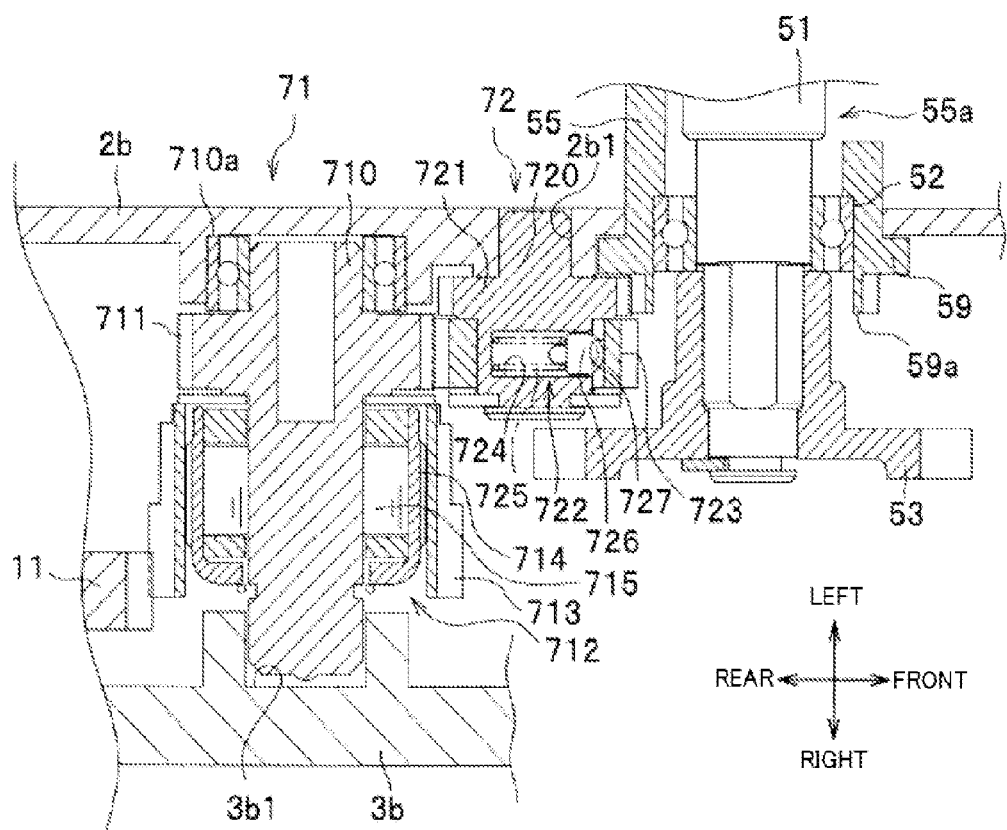
FIG. 5b is a sectional view showing essential portions of a switch mechanism.

Referring to FIG. 5b, the one-way gear 71 may include a supporting shaft 710, an output gear 711 formed on the supporting shaft 710, and an input gear 713 disposed on the supporting shaft 710 via a one-way clutch 712. The one-way gear 71 may allow the input gear 713 to rotate freely (the idling state) when the input gear 713 is rotated counterclockwise by the drive gear 11. Whereas when the input gear 713 is rotated clockwise by the drive gear 11, the one-way gear 71 may allow the input gear 713 to engage with the supporting shaft 710 (the output gear 711) (the force transmission state).

A proximal end of the supporting shaft 710 may be rotatably supported via a bearing 710a on a lateral surface of the right frame 2b, and a distal end of the supporting shaft 710 may be supported by a supporting portion 3b1 provided on an inner surface of the right cover 3b. The output gear 711 may be formed integrally with the supporting shaft 710 and engaged with an input gear 723 of a friction gear 72. The one-way clutch 712 may include a retainer 714 disposed around the supporting shaft 710, and a plurality of rolling members (rollers) 715 retained by the retainer 714 in such a way that they can roll inside the retainer 714. The rolling members 715 are pressed and biased counterclockwise by springs (not shown) provided on the retainer 714. On an inner peripheral surface of the 714, provided is a free roll region (not shown) where the rolling members 715 are shifted clockwise against the bias of the spring and become free to roll. On the inner peripheral surface of the 714, also provided is an inhibition surface (not shown) where the rolling members 715 are shifted counterclockwise by the spring, and rolling of the rolling members 715 are inhibited by a wedge effect. The input gear 713 may be attached integrally with the outer periphery of the retainer 714, and engaged with the drive gear 11 that is friction-engaged with the handle shaft 8a via the drag device 8b.

When the input gear 713 rotates in the direction (counterclockwise) indicated by the arrow Y2 shown in FIG. 3, the rolling members 715 in the one-way gear 71 are shifted to the free roll region against the bias of the spring, and the input gear 713 becomes free to rotate with respect to the supporting shaft 710. In other words, the input gear 713 rotates freely when the drive gear 11 is rotated in the direction indicated by the arrow X1 shown in FIG. 3 by rotational operation (winding operation) of the handle 8, and the rotational force (drive force) transmitted from the drive gear 11 to the output gear 711 is not output from the output gear 711. When the input gear 713 is rotated in the direction (clockwise) indicated by the arrow X2 shown in FIG. 3, the rolling members 715 are pushed by the bias force of the spring and wedge-engaged with the inhibition surface, and the input gear 713 becomes rotatable integrally with the supporting shaft 710. In other words, when the fishing line S is drawn out against the drag force of the drag device 8b and the drive gear 11 rotates in the direction (counterclockwise) indicated by the arrow Y1 shown in FIG. 3, the input gear 713 and the supporting shaft 710 are coupled to each other and rotate together. The rotational force (draw-out force) transmitted from the drive gear 11 is output from the output gear 711 to the friction gear 72. The fishing line S is drawn out against the drag force in this way, and the friction gear 72 is driven via the one-way gear 71 only when the drive gear 11 rotates in the Y1 direction (counterclockwise) shown in FIG. 3.

Referring to FIG. 5*b*, the one-way gear 72 may include a supporting shaft 720, an output gear 721 formed on the supporting shaft 720, and an input gear 723 disposed on the supporting shaft 720 via a friction mechanism 722. The friction gear 72 may transmit the rotational force of the one-way gear 71 to the rotation plate 59 in the downstream, and may be configured to slip if the friction gear is overloaded by a torque exceeding a prescribed torque.

The proximal end of the supporting shaft 720 may be rotatably supported in a support opening 2*b*1 formed on the lateral surface of the right frame 2*b*. The output gear 721 may be formed integrally with the supporting shaft 720 and meshed with an interlock gear 59*a* disposed at the distal end of the rotation plate 59. The friction mechanism 722 may include a concave portion 724 in the supporting shaft 720, a biasing spring 725 housed within the concave portion 724, an engaging member 726 biased by the biasing spring 725, and an engagement receiving portion 727 disposed circumferentially on the inner periphery of the input gear 723 with a gap. The engaging member 726 may be configured to be pressed onto the engagement receiving portion 727 and engaged therewith.

In this friction mechanism 722, the engagement between the engaging member 726 and the engagement receiving portion 727 is released when a torque exceeding a prescribed torque is imposed, and the input gear 723 and the supporting shaft 720 slip relative to each other. In other words, when a torque exceeding the prescribed torque acts between the supporting shaft 720 and the input gear 723, they slip relative to each other and the input gear 723 continues to slip. Therefore, an excessive rotational force (drive force) will not be given to the rotation plate 59.

The friction gear 72 is rotated in the direction (counterclockwise) indicated by the arrow Y3 shown in FIG. 3 by the rotational force generated by the output gear 711 of the one-way gear 71, and thereby the rotation plate 59 in the downstream is rotated in the direction (clockwise) indicated by the arrow X4 shown in FIG. 3. In this manner, the attitude of the fishing line guide 60 is switched from the fishing line winding state shown in FIG. 3 to the fishing line releasing state shown in FIG. 4.

Operations of a fishing reel having the above-described configurations will be now described. When the operation member 21 is pressed down in the clutch-On state shown in FIG. 10*a*, the clutch plate 25 is rotated counterclockwise and retained in the state as shown in FIG. 10*b* by the switching spring 23 (see FIG. 4). At this point, the cam surfaces 26 formed on the surface of the clutch plate 25 shifts the yoke 22 in the axial direction as shown in FIG. 4, and the pinion 12 is detached from the spool shaft 5 (see FIG. 1) (the clutch-Off state). Moreover, the rotation plate 59 is rotated on the center of the warm shaft 51 by the rotation of the clutch plate 25. In this manner, the fishing line guide 60 is rotated via the tubular body 55 (see FIG. 6) and switched from the fishing line winding state to the fishing line releasing state.

In the rotated fishing line guide 60, the spool 5A is free to rotate (the fishing line releasing state), and the fishing line S in the narrow guide portion 67 is released from the control portion 69 (FIG. 7*a*) and moved into the wide opening 68. In the normal fishing line releasing state, an amount of the fishing line wound around the spool 5A is large and the fishing line S can move into the wide opening 68 as soon as it is released from the restriction by the control portion 69.

Under such state, the fishing line S can be released by a casting operation and the like. Because the wide opening 68 of the fishing line guide 60 is formed wider in the left-right direction, a contact resistance which the fishing line receives from the inner surface of the wide opening 68 is low, and a casting distance of a fishing tackle would not be reduced. In other words, it is possible to reduce the resistive force worked on the fishing line S when the fishing line is released from the fishing line guide 60. When the fishing line is being released, the pinion 12 is detached from the engagement portion 5*a* of the spool shaft 5 so that the driving force is not transmitted to the drive gear 11 meshing with the pinion 12, and the rotational force of the spool 5A is not input in the switch mechanism 70.

Figure 10A:
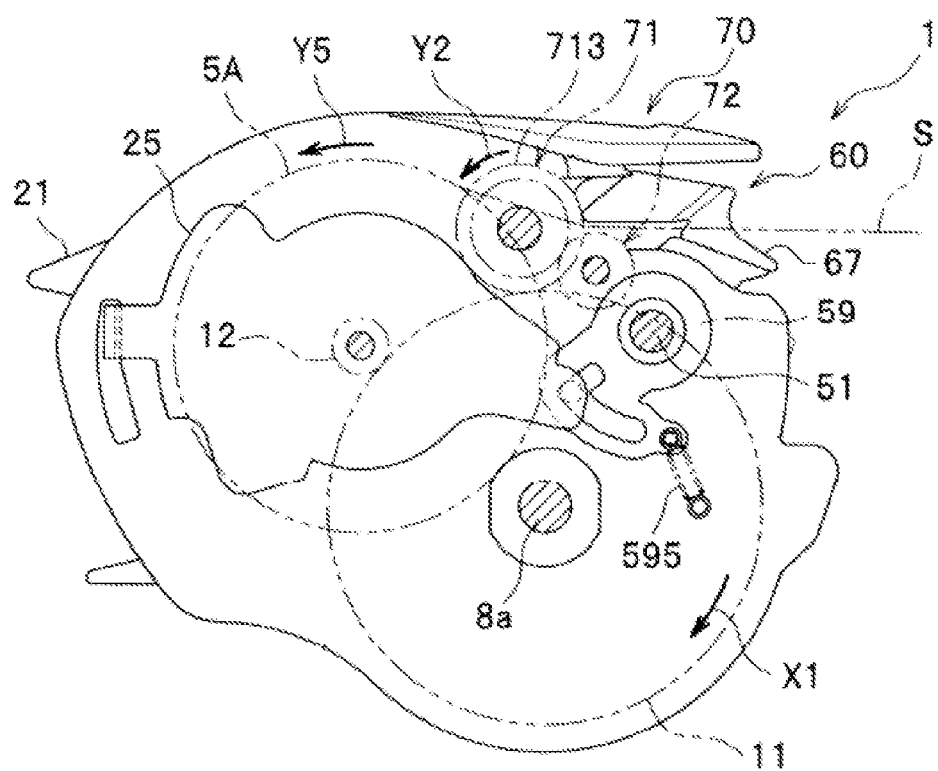
FIG. 10a is an explanatory drawing for a fishing line winding operation.
Figure 10B:
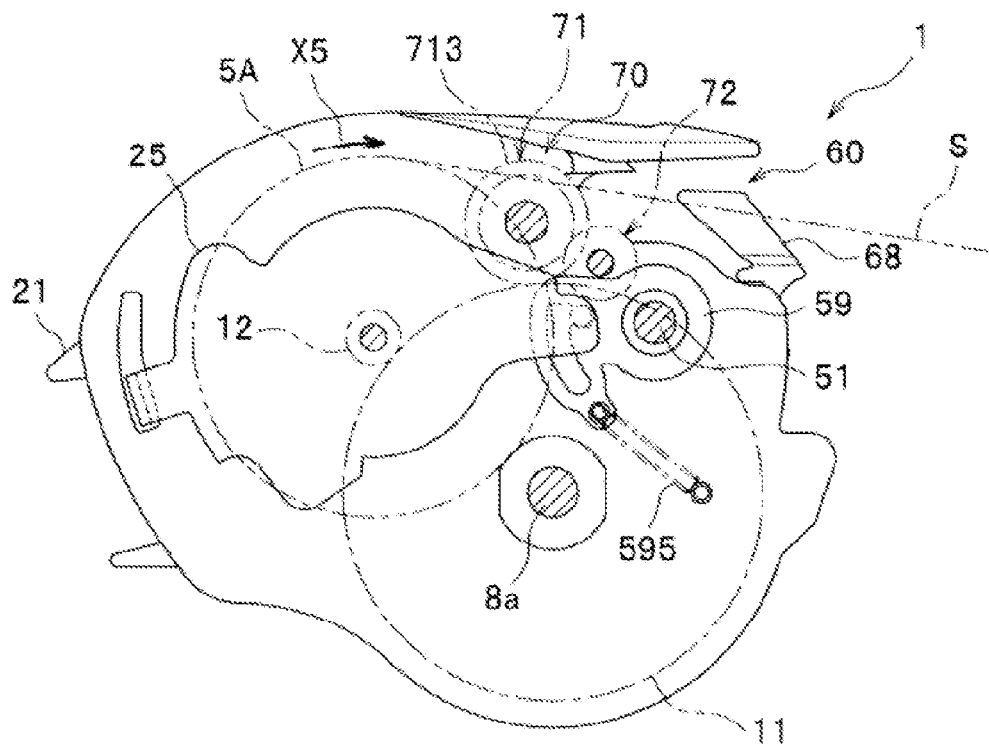
FIG. 10b is an explanatory drawing for a fishing line releasing operation.

When the handle 8 is then operated for winding in order to return the clutch mechanism 20 to the On state, the clutch plate 25 is automatically returned to the position shown in FIGS. 3 and 10*a* by the automatic return mechanism 30. In accordance with the return of the clutch plate 25 to the On state, the tubular body 55 is rotated via the rotation plate 59 and the fishing line guide 60 is switched from the fishing line releasing state to the fishing line winding state. At this point, the fishing line S situated at any position within the wide opening 68 as shown in FIG. 9*b* is touched with and pressed down by the rotated control portion 69, and subsequently guided along the sloping guide surface 68*a* of the wide opening 68 to the narrow guide portion 67 (see FIGS. 7*a* and 7*b*). Moreover, in the fishing line winding state, the control section 69 prevents disengagement of the fishing line S from the narrow guide portion 67 as illustrated in FIG. 7*a*.

When the handle 8 is further operated for winding from this state, the drive gear 11 is rotated in the direction (clockwise) indicated by the arrow X1 shown in FIG. 10*a* and the spool 5A is rotated in the direction (counterclockwise, the fishing line winding direction) indicated by the arrow Y5 via the pinion 12. In addition, when the handle 8 is operated for winding, the warm shaft 51 of the level wind device 50 (see FIG. 2) is rotated via the coupling gear 8*c* (see FIG. 3) on the handle shaft 8*a* and the input gear 53 (see FIG. 5*a*) meshed with the coupling gear 8*c*. The fishing line guide 60 reciprocates along the tubular body 55 in the left-right direction in accordance with the rotation of the warm shaft 51 via the slider 61 (see FIG. 6) engaged with the spiral groove 5*a* (see FIG. 6) formed on the outer peripheral surface of the warm shaft 51. Since the detents 55*b* (see FIG. 6) extending out along the axial direction are formed on the periphery of the tubular body 55, the fishing line guide 60 does not rotate on the shaft but reciprocates in the left-right direction. Thus the fishing line S is stably wound around the spool 5A in parallel with the aid of the narrow guide portion 67 that is formed narrower in the left-right direction. Moreover, since disengagement of the fishing line from the narrow guide portion 67 is prevented by the control portion 69 placed in the appropriate position, it is possible to realize a stable parallel winding of the fishing line. When a little amount of the fishing line S is wound around the spool 5A, for example, because a large amount of the fishing line S has been released, the fishing line S situated in the narrow guide 67 may be not touched with the control portion 69.

When the handle 8 is operated or winding, the input gear 713 of the one-way gear 71 in the switch mechanism 70 slides in the Y2 direction (counterclockwise) by the rotational force of the drive gear 11 rotating in the X1 direction (clockwise direction) as illustrated in FIG. 10*a*. Therefore, the rotational force exerted by the drive gear 11 is not transmitted to the friction gear 72, and the fishing line guide 60 is retained in the fishing line winding state by the spring force of the return spring 595. In this way, the fishing line is adequately wound through the narrow guide portion 67 of the fishing line guide 60.

Figure 11A:
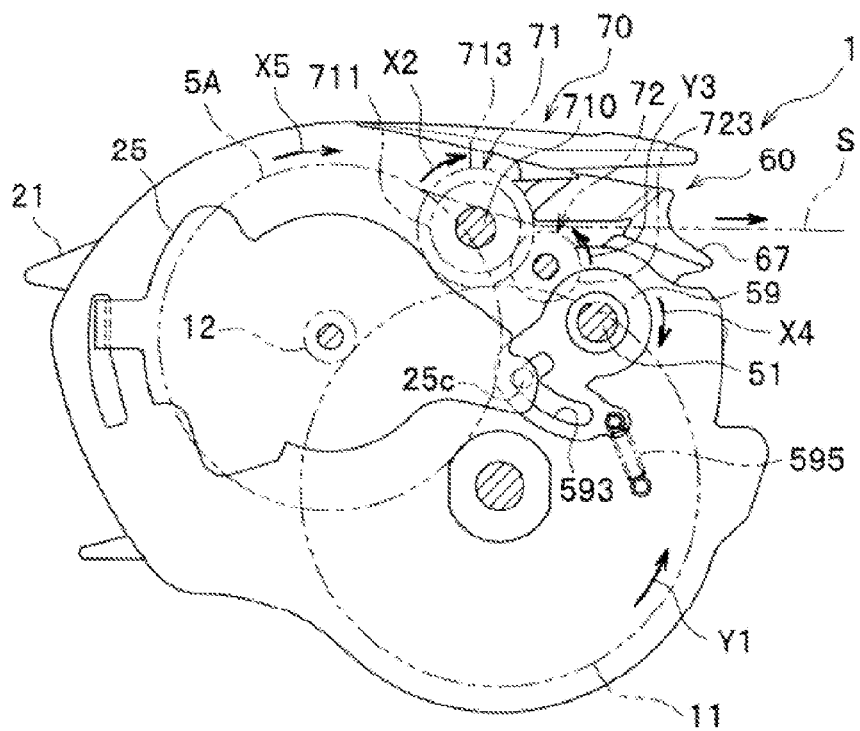
FIG. 11a illustrates a state where a fishing line is drawn out against a drag force when the fishing line is wound.

Operations when the fishing line S is drawn out in the clutch-On state will be now described. Referring to FIG. 11a, when the fishing line S is drawn out from the spool 5A against the drag force of the drag device 8b (see FIG. 2) in the clutch-On state, the rotational force (draw-out force) is transmitted from the spool shaft 5 (see FIG. 2) to the drive gear 11 via the pinion 12. The drive gear 11 is friction-engaged with the handle shaft 8a whose reverse rotation is prevented by a one-way clutch K so that the drive gear 11 rotates (drag-slips) in the direction (counterclockwise) indicated by the arrow Y1 in FIG. 11a by the rotational force. The input gear 713 of the one-way gear 71 meshing with the drive gear 11 is then rotated in the direction (clockwise) indicated by the arrow X2 in FIG. 11a. During the rotation of the input gear in the X2 direction, the input gear 713 in the one-way gear 71 rotates together with the supporting shaft 710 due to the one-way clutch 712 (see FIG. 5b) so that the rotational force from the drive gear 11 is transmitted to the friction gear 72 via the output gear 711.

Accordingly, the input gear 723 of the friction gear 72 is rotated in the direction (counterclockwise) indicated by the arrow Y3 shown in FIG. 11a, and the output gear 721 (see FIG. 5b) is rotated counterclockwise via the friction mechanism 722 (see FIG. 5b) and the supporting shaft 720 (see FIG. 5b). The rotation plate 59 meshing with the output gear 721 is rotated in the direction (clockwise) indicated by the arrow X4 shown in FIG. 11a by the rotation of the output gear 721, thereby the fishing line guide 60 retained in the fishing line winding state is rotated clockwise on the warm shaft 51. In this manner, the attitude of the fishing line guide 60 is switched from the fishing line winding state to the fishing line releasing state (see FIG. 11b).

Figure 11B:
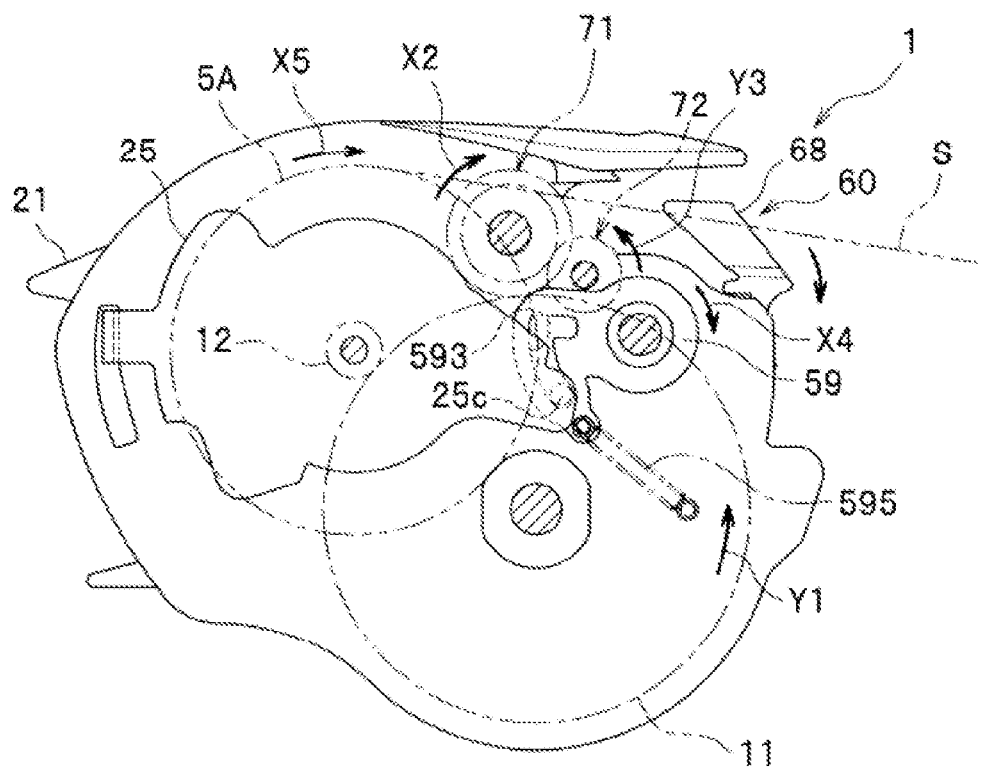
FIG. 11b illustrates a state where the fishing line guide is rotated to the fishing line releasing state.

In response to the attitude switch, the fishing line S inserted through the narrow guide portion 67 during winding, is moved into the wide opening 68 as shown in FIG. 11b, and the fishing line S is drawn out through the wide opening 68. On the rotation plate 59, the second long opening 593 is formed in a circular arc shape concentric with the warm shaft 51. The engaging projection 25c of the clutch plate 25 is engaged in the second long opening 593 initially at the upper end portion of the opening, and the rotation plate 59 is rotated until the engaging projection 25c is situated at the lower end portion of the second long opening 593. Therefore, the attitude of the fishing line guide 60 is switched (moved) from the fishing line winding state to the fishing line releasing state (FIG. 11b) in the clutch-On state without rotating the clutch plate 25.

When the fishing line S is continuously drawn out after the fishing line guide 60 is switched to the fishing line releasing state (see FIG. 11b) and a load exceeding a prescribed torque is worked on the friction gear 72, the engagement between the engagement receiving portion 727 and the engaging member 726 shown in FIG. 5b is released, and the supporting shaft 720 and the input gear 723 slip relative to each other. In this way, an excessive rotational force (drive force) would not be given to the rotation plate 59 while the fishing line guide 60 is maintained at the fishing line releasing state (see FIG. 11b).

Figure 12:
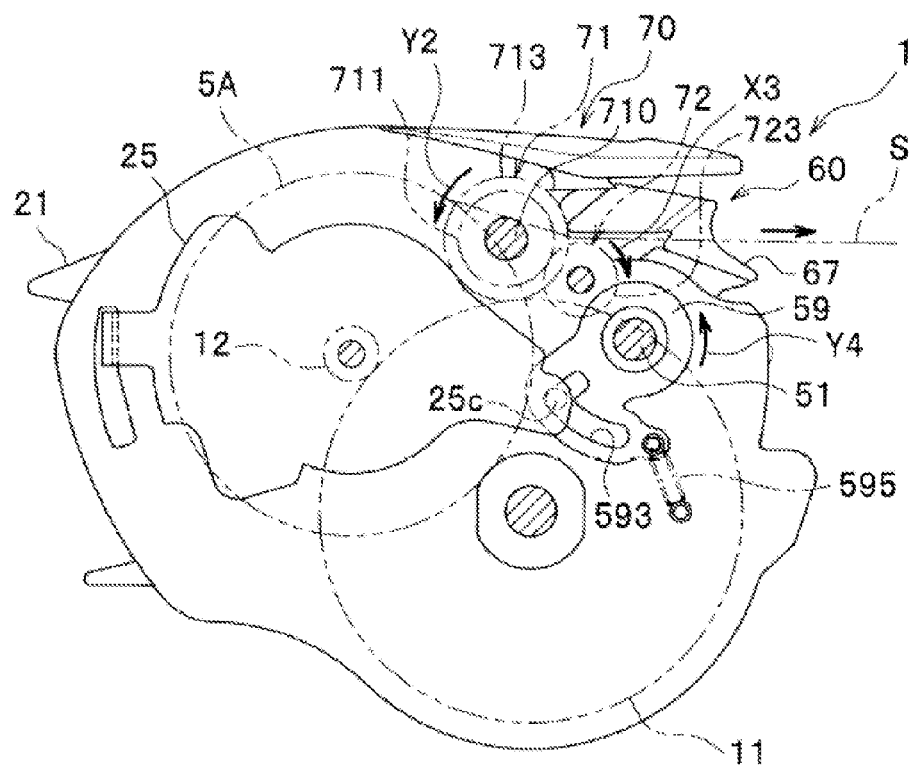
FIG. 12 illustrates a state where drawing out of the fishing line is stopped.

When drawing out of the fishing line S against the drag force is stopped, the rotation plate 59 is rotated in the direction (counterclockwise) indicated by the arrow Y4 shown in FIG. 12 by the bias force of the return spring 595 as illustrated in FIG. 12, and the fishing line guide 60 returns from the fishing line releasing state to the fishing line winding state. The rotation of the rotation plate in the Y4 direction (counterclockwise) rotates the friction gear meshing with the rotation plate in the direction (clockwise) indicated by the arrow X3 shown in FIG. 12, moreover the rotation of the friction gear 72 rotates the output gear 711 of the one-way gear 71 meshing with the friction gear 72 in the direction (counterclockwise) indicated by the arrow Y2 shown in FIG. 12. The rotation of the output gear 711 in the Y2 direction (counterclockwise) is allowed since the drive gear 11 coupled to the input gear 713 is rotated in the winding rotation direction (the direction indicated by the arrow X1 in FIG. 12). In other words, when the handle 8 is operated for winding after the drawing out of the fishing line S against the drag force has been stopped, the fishing line guide 60 returns to the fishing line winding state from the fishing line releasing state.

If the fishing line S is drawn out from the spool 5A against the drag force of the drag device 8b (see FIG. 2) during winding of the fishing line, the fishing line guide 60 is rotated from the fishing line winding state to the fishing line releasing state due to the above-described mechanism. When the rotational force (draw-out force) to draw out the fishing line S from the spool 5A becomes smaller with respect to the rotational force (wind-up rotational force) of the drive gear 11, the fishing line guide 60 then returns to the fishing line winding state from the fishing line releasing state due to the above-described mechanism.

In the fishing reel according to the embodiment described above, when the fishing line S is wound around the spool 5A in other words in the fishing line winding state, the fishing line S is situated in the narrow guide portion 67 and the fishing line S is uniformly wound around the spool 5A through the narrow guide portion 67 so that the fishing line S can be adequately wound in parallel around the spool 5A.

When the fishing line S is drawn out against the drag force in the fishing line winding state, the fishing line S is situated in the wide opening 68 and the fishing line S is draw out through the wide opening 68, thereby the resistive force acting on the drawing out of the fishing line S can be reduced. Therefore, the fishing line S tends to be less damaged compared to the fishing line drawn out through the narrow guide portion 67. Moreover, it is possible to reduce the load of the drawing out of the fishing line working on the level wide device 50.

Because the resistive force acting on the drawing out of the fishing line S is reduced, variations in the drag force is less likely to occur and therefore it is possible to prevent defects including degradation of dragging performance and the like. Thus, a desired dragging performance can be obtained and consequently it is possible to enhance engagement and sensitivity of the fishing line, and operability of the fishing reel.

In addition, because the fishing line guide 60 is switchable by switching the clutch mechanism 20, adequate winding and releasing of the fishing line S in conjunction with the switching of the clutch mechanism can be realized. As a result, it is possible to obtain a fishing reel with an excellent operability.

Second Embodiment

A fishing reel according to the second embodiment is illustrated in FIGS. 13 to 16. Unlike the first embodiment, a one-way gear 71A of the switch mechanism 70 is directly attached to the pinion 12 in the second embodiment. More specifically, in this embodiment, referring to FIG. 13, the one-way gear 71A is rotated by the rotation of the pinion 12 and the rotational force of the one-way gear 71A is transmitted to the rotation plate 59 via the friction gear 72. The friction gear 72 of the second embodiment has the same structure and action as the first embodiment except for the diameter which is larger than that of the first embodiment. The rotation plate 59 and the structures around there of the second embodiment are also same as those of the first embodiment.

Figure 13:
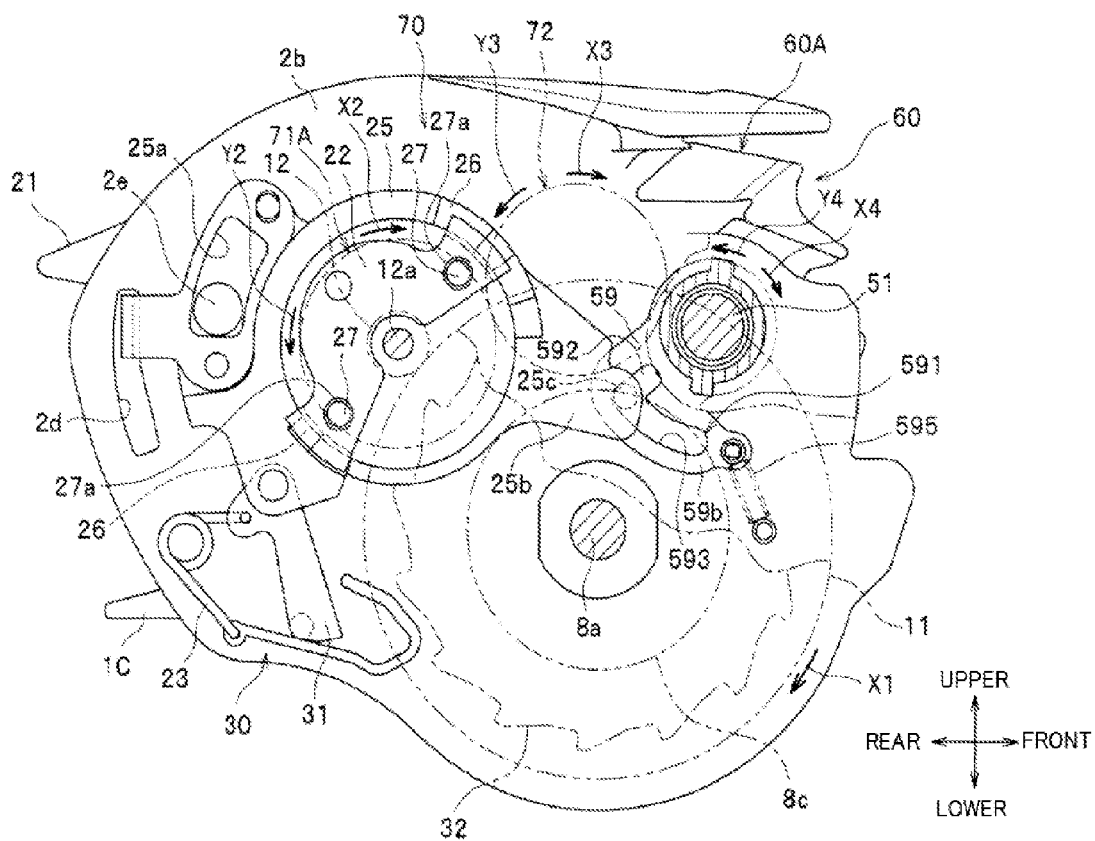
FIG. 13 is a side view of a fishing reel according to a second embodiment of the present disclosure showing a force transmission portion of a clutch mechanism (clutch-On state).
Figure 14:
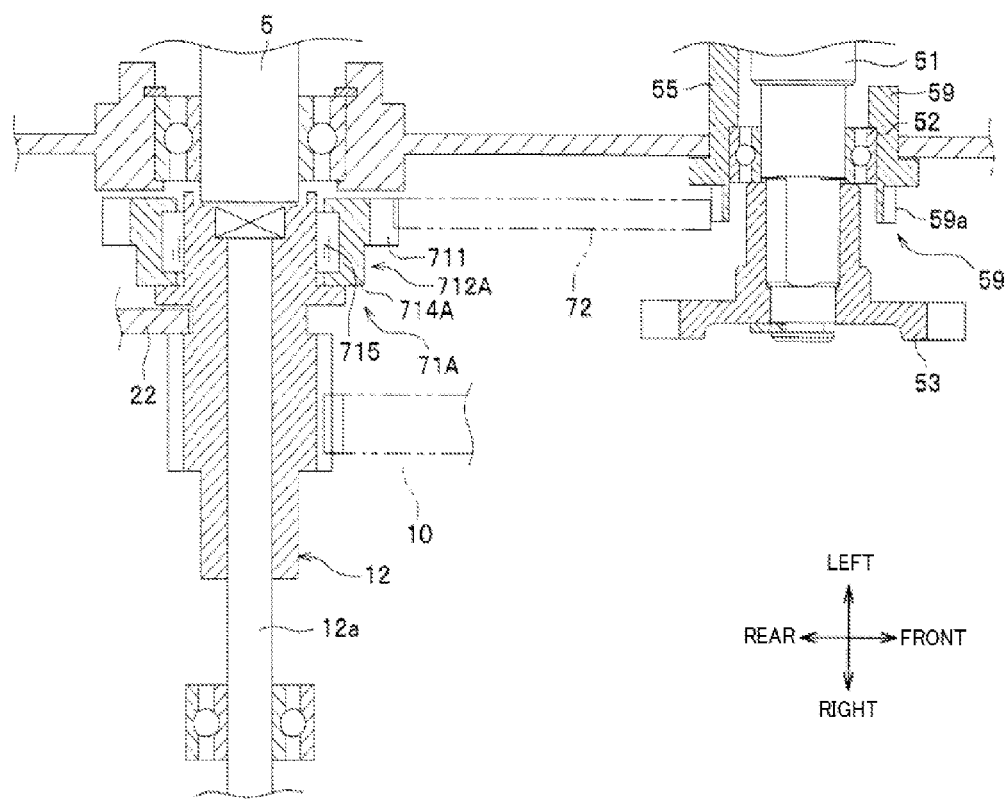
FIG. 14 is a sectional view showing essential portion of a switch mechanism of the fishing reel of FIG. 13.

Referring to FIG. 14, the one-way gear 71A may include a one-way clutch 712A and the output gear 711 disposed via the one-way clutch 712A. The one-way gear 71A is configured to allow the output gear 711 to rotate freely when the pinion 12 is rotated counterclockwise (in the direction indicated by the arrow Y2 shown in FIG. 13, in the fishing line winding state), whereas the one-way gear 71A allows the pinion gear 12 to engage with the output gear 711 when the pinion 12 is rotated clockwise (in the direction indicated by the arrow X2 shown in FIG. 13, when the fishing line S is drawn out against the drag force in the clutch-On state).

Referring to FIG. 14, the one-way clutch 712A may include a retainer 714A disposed around the pinion 12, and the plurality of rolling members (rollers) 715 retained by the retainer 714A in such a way that they can roll inside the retainer 714A. On the inner peripheral surface of the 714A, the free roll region (not shown) and the inhibition surface (not shown) same as those of the first embodiment are formed. The output gear 711 is disposed on the outer surface of the retainer 714A and meshed with the friction gear 72.

When the pinion 12 rotates in the direction (counterclockwise) indicated by the arrow Y2 shown in FIG. 13, the rolling members 715 in the one-way gear 71A are shifted to the free roll region against the bias of the spring, and the output gear 711 becomes free to rotate with respect to the pinion 12. In other words, the output gear 711 rotates freely when the drive gear 11 is rotated in the direction indicated by the arrow X1 shown in FIG. 13 by rotational operation (winding operation) of the handle 8, and the rotational force (drive force) transmitted from the drive gear 11 to the output gear 711 via the pinion 12 is not output therefrom. When the pinion 12 is rotated in the direction (clockwise) indicated by the arrow X2 shown in FIG. 13, the rolling members 715 are pushed by the bias force of the spring and wedge-engaged with the inhibition surface, and the pinion 12 becomes rotatable together with the supporting shaft 711. In other words, when the fishing line S is drawn out against the drag force of the drag device 8b and the pinion 12 rotates in the direction (clockwise) indicated by the arrow X2 shown in FIG. 13, the pinion 12 and the output gear 711 are coupled to each other and rotate together. The rotational force (draw-out force) transmitted from the pinion 12 is output from the output gear 711 to the friction gear 72. The fishing line S is drawn out against the drag force in this way, and the friction gear 72 is driven via the one-way gear 71 only when the pinion 12 rotates in the X2 direction (clockwise) shown in FIG. 13.

Operations of a fishing reel having the above-described configurations will be now described. When the operation member 21 is pressed down in the clutch-On state shown in FIG. 15a, the clutch plate 25 is retained in the state as shown in FIG. 15b and the pinion 12 is detached from the engaging portion 5a (see FIG. 14) of the spool shaft 5 (the clutch-Off state). In this manner, the spool 5A rotates freely and the fishing line S can be released by a casting operation and the like. In other words, the switch mechanism 70 is detached from the spool 5A when the fishing line is released.

Figure 15A:
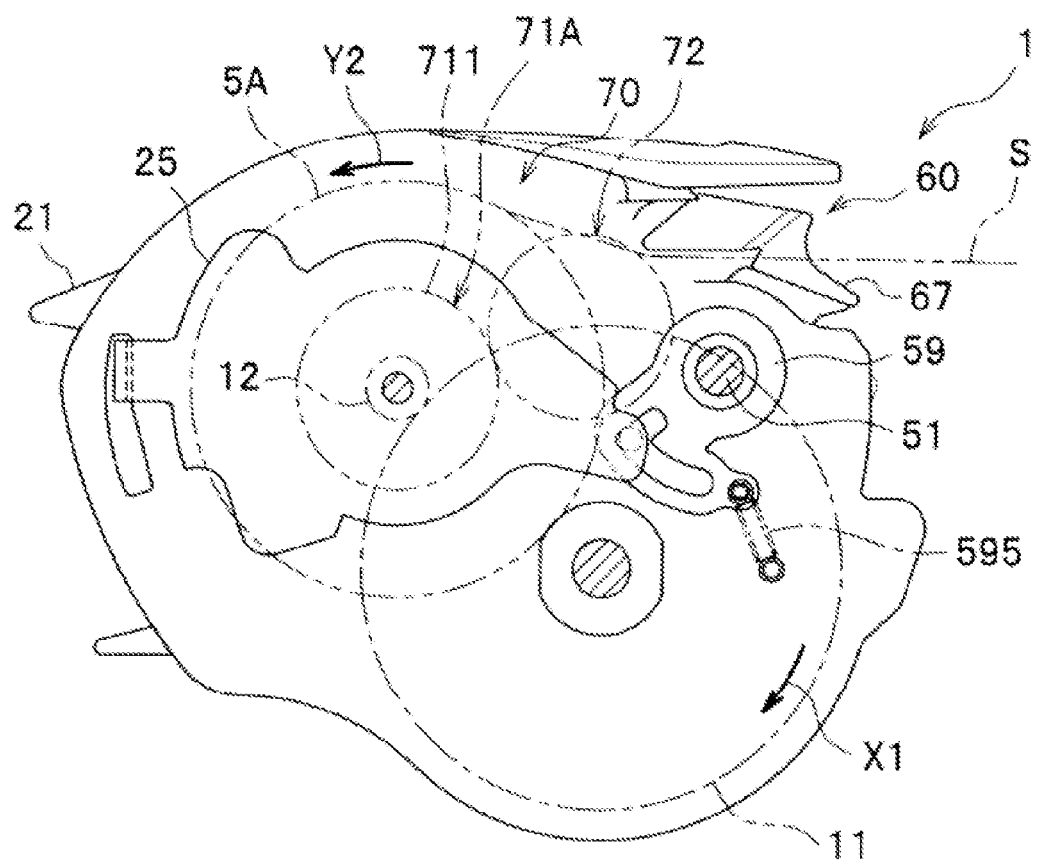
FIG. 15a is an explanatory drawing for a fishing line winding operation.
Figure 15B:
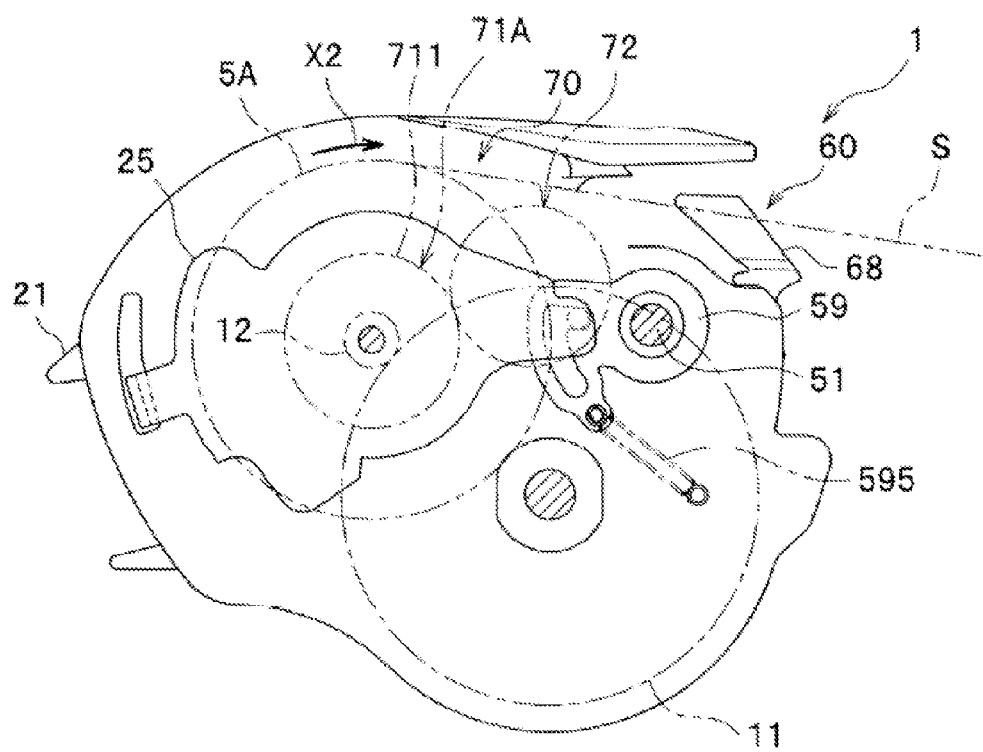
FIG. 15b is an explanatory drawing for a fishing line releasing operation.

When the clutch mechanism 20 is then returned to the On-state by the winding operation of the handle 8, the pinion 12 is engaged with the spool shaft 5 and the rotational force of the drive gear 11 is transmitted to the spool 5A via the pinion 12, thereby the spool 5A is rotated in the direction (counterclockwise) indicated by the arrow Y2 shown in FIG. 15a. In other words, the switch mechanism 70 is coupled to the spool 5A when the fishing line is wound.

In this fishing line winding state, the pinion 12 is rotated in the Y2 direction, and the output gear 711 in the switch mechanism 70 slips due to the action of the one-way gear 71A. Therefore, the rotational force of the pinion gear 12 is not transmitted to the friction gear 72, and the fishing line guide 60 is retained in the fishing line winding state by the spring force of the return spring 595. In this way, the fishing line is adequately wound through the narrow guide portion 67 of the fishing line guide 60.

Figure 16A:
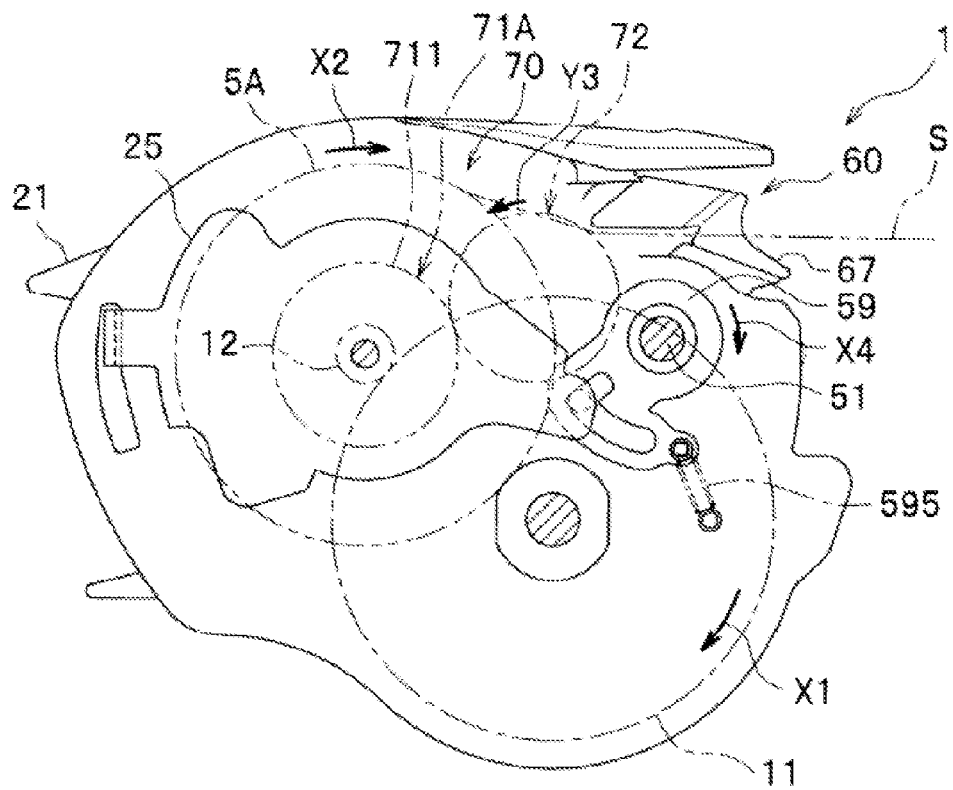
FIG. 16a illustrates a state where a fishing line is drawn out against a drag force when the fishing line is wound.

Operations when the fishing line S is drawn out in the clutch-On state will be now described. Referring to FIG. 16a, when the fishing line S is drawn out from the spool 5A against the drag force of the drag device 8b (see FIG. 2) in the clutch-On state, the pinion 12 is rotated in the direction (clockwise) indicated by the arrow X2 shown in FIG. 16a. During the rotation of the pinion gear in the X2 direction, the output gear 711 in the one-way gear 71A rotates together with the pinion 12 due to the one-way clutch 712A (see FIG. 14) so that the rotational force from the pinion 12 is transmitted to the friction gear 72 via the output gear 711.

The friction gear 72 is then rotated in the direction (counterclockwise) indicated by the arrow Y3 shown in FIG. 16a, and the rotation plate 59 meshing with the friction gear 72 is rotated in the direction (clockwise) indicated by the arrow X4 shown in FIG. 16a. In this manner, the fishing line guide 60 retained in the fishing line winding state is rotated clockwise on the warm shaft 51 and switched to the fishing line releasing state as illustrates in FIG. 16b.

The fishing line S inserted through the narrow guide portion 67 during winding is moved into the wide opening 68, and the fishing line S is drawn out through the wide opening 68.

After the fishing line guide 60 is switched to the fishing line releasing state (see FIG. 11b) and when the fishing line S is continuously drawn out to reach a load on the friction gear 72 that exceeds a prescribed torque, the friction gear 72 slips as described above so that an excessive rotational force (drive force) does not work on the rotation plate 59 while the fishing line guide 60 is retained in the fishing line releasing state (see FIG. 11b).

Figure 16B:
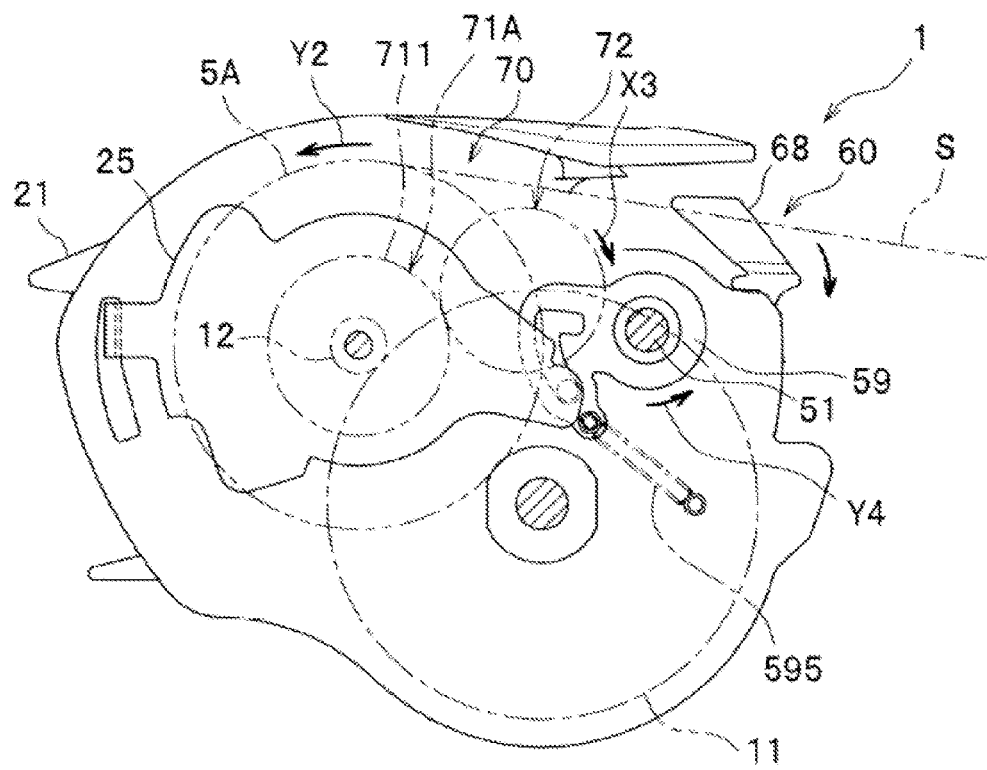
FIG. 16b illustrates a state where the fishing line guide is rotated to the fishing line releasing state.

When drawing out of the fishing line S against the drag force is stopped, the rotation plate 59 is rotated in the direction (counterclockwise) indicated by the arrow Y4 shown in FIG. 16b by the bias force of the return spring 595, and the fishing line guide 60 returns from the fishing line releasing state to the fishing line winding state. The rotation of the rotation plate 59 in the Y4 direction (counterclockwise) rotates the friction gear 72 meshing with the rotation plate 59 in the direction (clockwise) indicated by the arrow X3 shown in FIG. 16b, moreover the rotation of the friction gear 72 rotates the output gear 711 of the one-way gear 71 meshing with the friction gear 72 in the direction (counterclockwise) indicated by the arrow Y2 shown in FIG. 16b. The rotation of the output gear 711 in the Y2 direction (counterclockwise) is allowed since the drive gear 11 coupled to the input gear 12 is rotated in the winding rotation direction (the direction indicated by the arrow X1 in FIG. 16a). In other words, when the handle 8 is operated for winding after the drawing out of the fishing line S against the drag force has been stopped, the fishing line guide 60 returns to the fishing line winding state from the fishing line releasing state.

The above-described second embodiment can also obtain the same advantageous effects as those of the first embodiment. Moreover, a space around the pinion 12 can be utilized to arrange the one-way gear 71A, resulting in space saving of the switch mechanism 70. In this way, it is possible to reduce the size of the fishing reel. In addition, it is possible to increase the size of the friction gear 72 by exploiting the space saving effect, and as a result, durability of the friction gear 72 can be improved.

Third Embodiment

Figure 17:
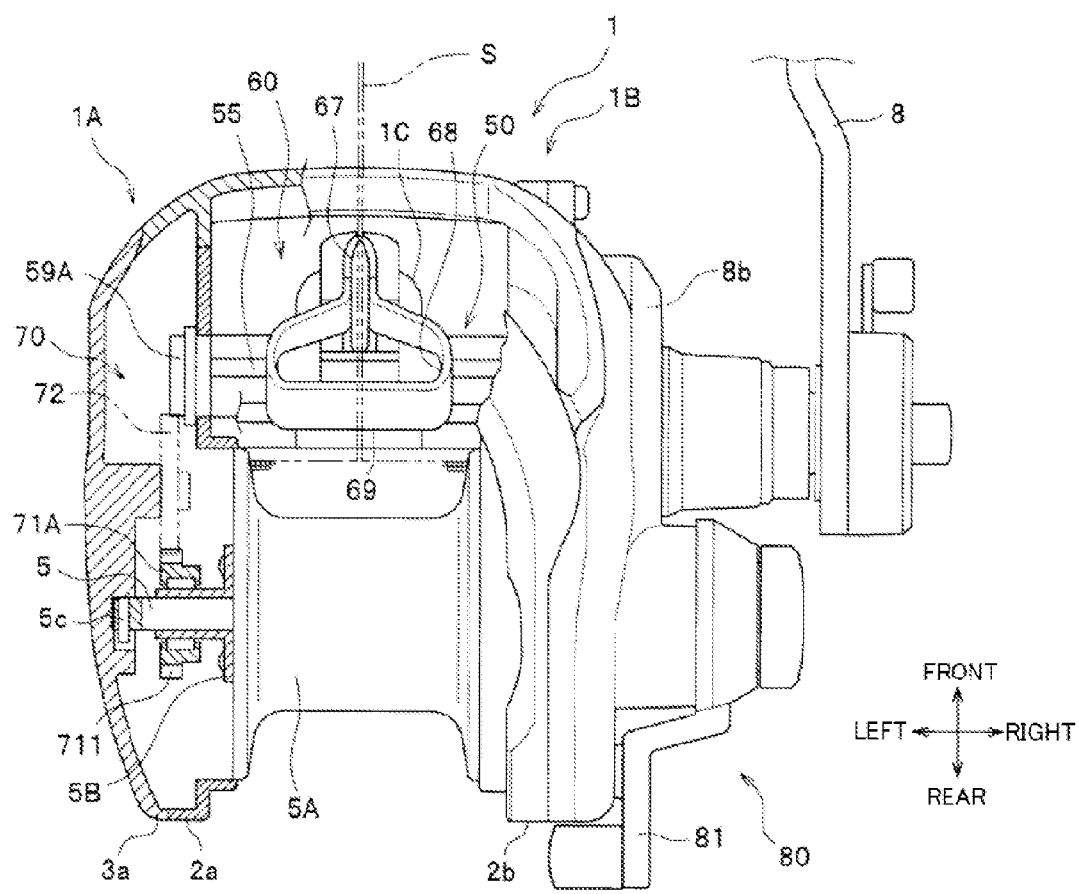
FIG. 17 is a plan view of a fishing reel according to a third embodiment of the disclosure, showing essential portions of the reel in section.

A fishing reel according to the third embodiment is illustrated in FIGS. 17 to 18. The third embodiment basically has the same structure as the first and second embodiments except that the switch mechanism 70 in the reel body has a lever drag mechanism 80. Referring to FIG. 17, the spool shaft 5 is unrotatably supported by the left cover 3a, and the spool 5A is rotatably supported on the spool shaft 5. The lever drag mechanism 80 is disposed on a side of the right frame 2b on the right side of the spool shaft 5 (supporting shaft) as shown in FIG. 17. A drag force of the lever drag mechanism 80 is adjustable by rotating a lever 81 in the front-rear direction. The lever drag mechanism 80 is configured to put a brake on the rotation of the spool 5A by increasing or decreasing a pressure of a drag disc disposed on a wind drive unit side in a braking unit (not shown) disposed on the right flange side of the spool 5A. The brake is controlled by the lever 81 through conventional cams and screws.

Referring again to FIG. 17, the switch mechanism 70 is disposed between the left frame 2a and the left cover 3a on the left side of the spool 5A. The switch mechanism 70 has the same structure as that of the second embodiment. More specifically, the switch mechanism 70 may include a supporting member 5B provided integrally on the lateral portion of the spool 5A, the one-way gear 71A disposed directly on the outer peripheral surface of a cylindrical portion of the supporting member 5B, the friction gear 72 meshing with the one-way gear 71A, and a rotation member 59A (which corresponds to the rotation plate 59).

The one-way gear 71A is configured to allow the output gear 711 to rotate freely when the spool 5A is rotated in the fishing line winding direction, allow the output gear 711 to engage with the spool shaft 5 when the spool 5A is rotated in the fishing line releasing (draw out) direction. In other words, the output gear 711 rotates freely when the spool 5A is rotated in the fishing line winding direction by rotational operation (winding operation) of the handle 8, and the rotational force (drive force) input from the spool shaft 5 is not output from the output gear 711. In other words, when the fishing line S is drawn out against the drag force adjusted by manipulation of the lever 81 and the spool 5A rotates in the fishing line releasing direction, the supporting member 5B and the output gear 711 are coupled to each other and rotate together. The rotational force (draw-out force) of the spool 5A is output from the output gear 711 to the friction gear 72. As described above, the friction gear 72 is driven via the one-way gear 71 only when the fishing line S is drawn out against the drag force and the spool 5A is rotated in the fishing line releasing direction.

The rotation member 59A has the return spring 595 (not shown) attached thereto between the left frame 2a and the rotation member 59A. The return spring 595 makes the fishing line guide 60 return from the fishing line releasing state to the fishing line winding state.

Operations of a fishing reel having the above-described configurations will be now described. When the fishing line S is to be released, the drag force exerted by the lever drag mechanism 80 is eased by a rotational operation of the lever 81. The spool 5A is then rotated in the fishing line releasing direction when, for example, a casting operation and the like is performed, and the supporting member 5B and the output gear 711 of the one-way gear 71A are coupled to each other to rotate together. In this manner, the rotational force (draw out force) of the spool 5A is output from the output gear 711 to the friction gear 72, and the rotation member 59A is rotated via the friction gear 72. The attitude of the fishing line guide 60 is switched from the fishing line winding state to the fishing line releasing state (see FIG. 18b) by the rotation of the rotation member 59A. After the attitude of the fishing line guide 60 is changed, when the fishing line S is continuously drawn out and a load exceeding a prescribed torque is worked on the friction gear 72, the friction gear 72 slips as described above. Accordingly it is possible to prevent an excessive rotational force (drive force) is worked on the rotation plate 59.

When the rotation of the spool 5A in the fishing line releasing direction is then stopped or about to be stopped, the fishing line guide 60 is returned to the fishing line winding state from the fishing line releasing state (see FIG. 18a) by the bias force of the return spring 595.

When the handle 8 is subsequently operated for winding, the spool 5A is rotated in the fish line winding direction and the fishing line S is evenly wound around the spool 5A. In this fishing line winding state, the output gear 711 slips due to the action of the one-way gear 71A so that the rotational force of the spool 5A is not transmitted to the friction gear 72 and the fishing line guide 60 is retained in the fishing line winding state by the spring force of the return spring 595. In this way, the fishing line is adequately wound through the narrow guide portion 67 of the fishing line guide 60.

When the fishing line S is drawn out from the spool 5A against the drag force adjusted by the lever drag mechanism 80, the spool 5A is rotated in the fishing line releasing direction, and the rotational force of the spool 5A and the supporting member 5B is transmitted from the output gear 711 via the one-way gear 71A to the friction gear 72.

Figure 18A:
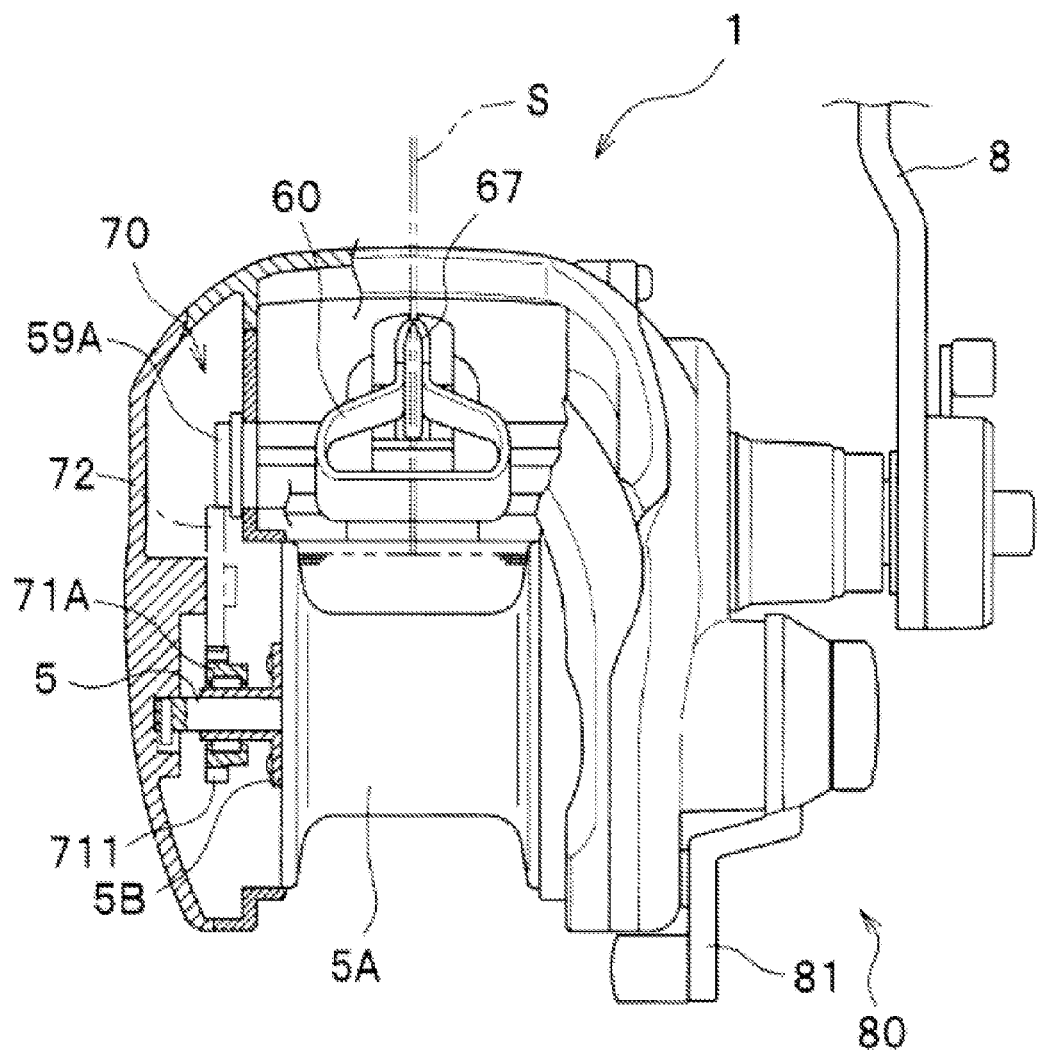
FIG. 18a is an explanatory drawing for a fishing line winding operation.
Figure 18B:
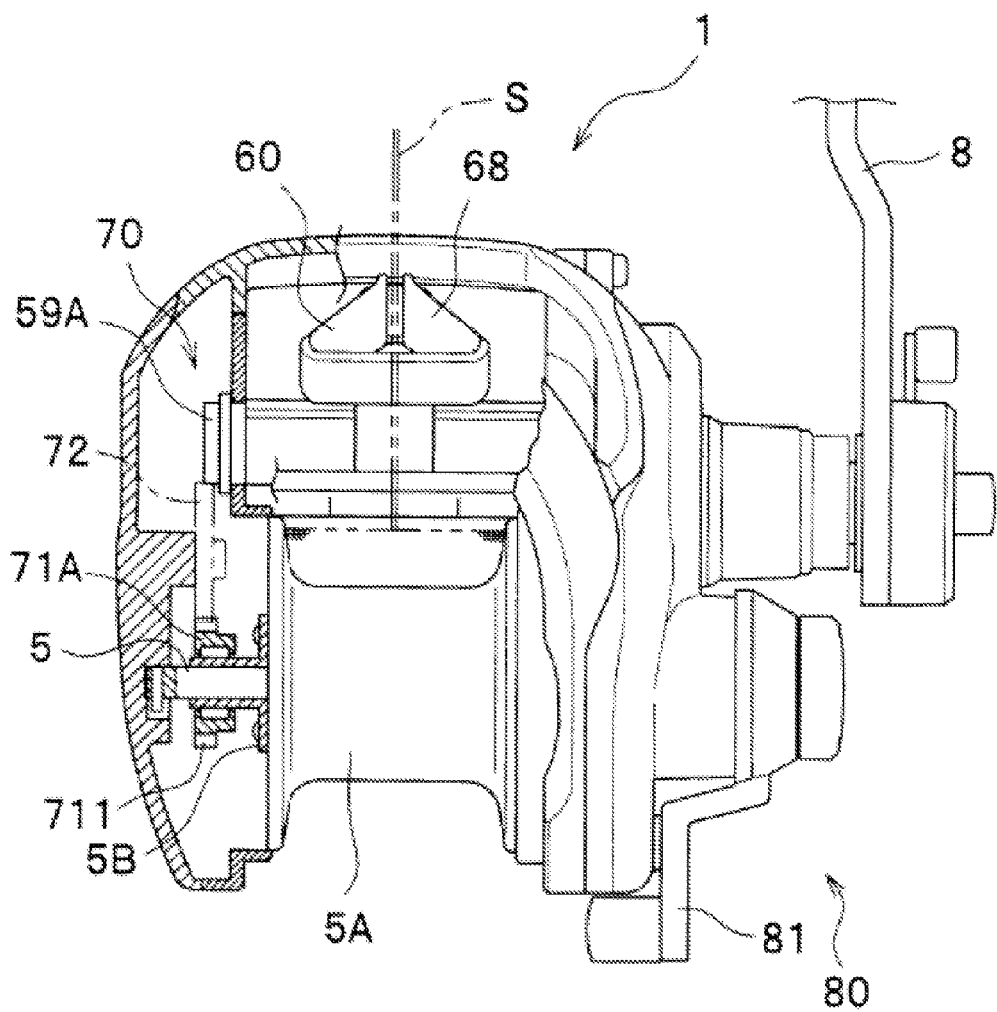
FIG. 18b is an explanatory drawing for a fishing line releasing operation.

The friction gear 72 is rotated in this manner thereby the rotation plate 59 is then rotated, and consequently the fishing line guide 60 retained in the fishing line winding state is rotated to the fishing line releasing state (see FIG. 18b).

The fishing line S inserted through the narrow guide portion 67 during winding is moved into the wide opening 68, and the fishing line S is drawn out through the wide opening 68.

After the fishing line guide 60 is switched to the fishing line releasing state (see FIG. 18b) and when the fishing line S is continuously drawn out and a load on the friction gear 72 exceeds a prescribed torque, the friction gear 72 slips as described above so that an excessive rotational force (drive force) does not work on the rotation plate 59 while the fishing line guide 60 is retained in the fishing line releasing state (see FIG. 18b).

When drawing out of the fishing line S against the drag force is then stopped, the rotation plate 59 is rotated by the bias force of the return spring 595, and the fishing line guide 60 returns from the fishing line releasing state to the fishing line winding state (see FIG. 18a).

The above-described third embodiment can also obtain the same advantageous effects as those of the first and second embodiments. Moreover, the switch mechanism 70A can be adequately provided in a simple fishing reel that does not have the clutch mechanism as the third embodiment does. Furthermore, because the switch mechanism 70 works due to the rotation of the spool 5A, it is possible to obtain a fine operational responsiveness of the fishing line guide 60 to switch its attitude. Therefore, a load worked on the lever drag mechanism 80 coupled to the spool 5A can be reduced.

Fourth Embodiment

Figure 19:
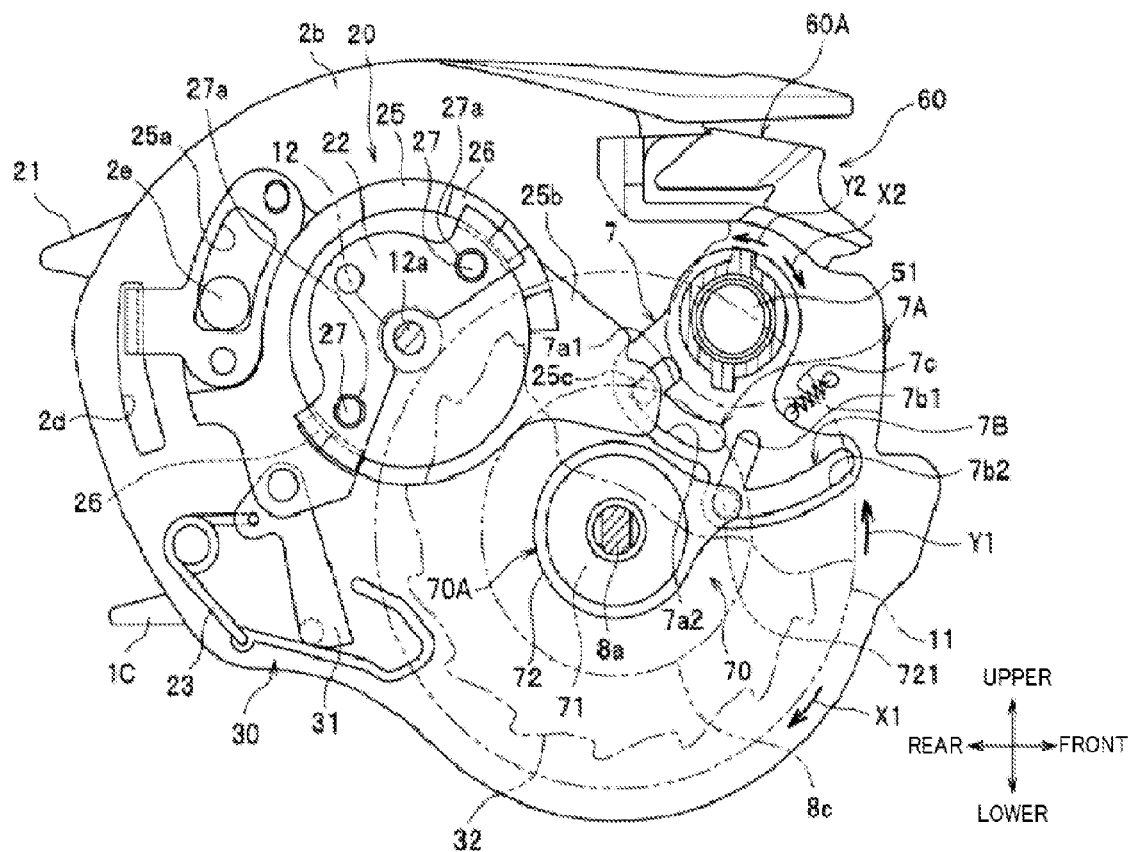
FIG. 19 is a side view of a fishing reel according to a forth embodiment of the present disclosure showing a force transmission portion of a clutch mechanism (clutch-On state).
Figure 20:
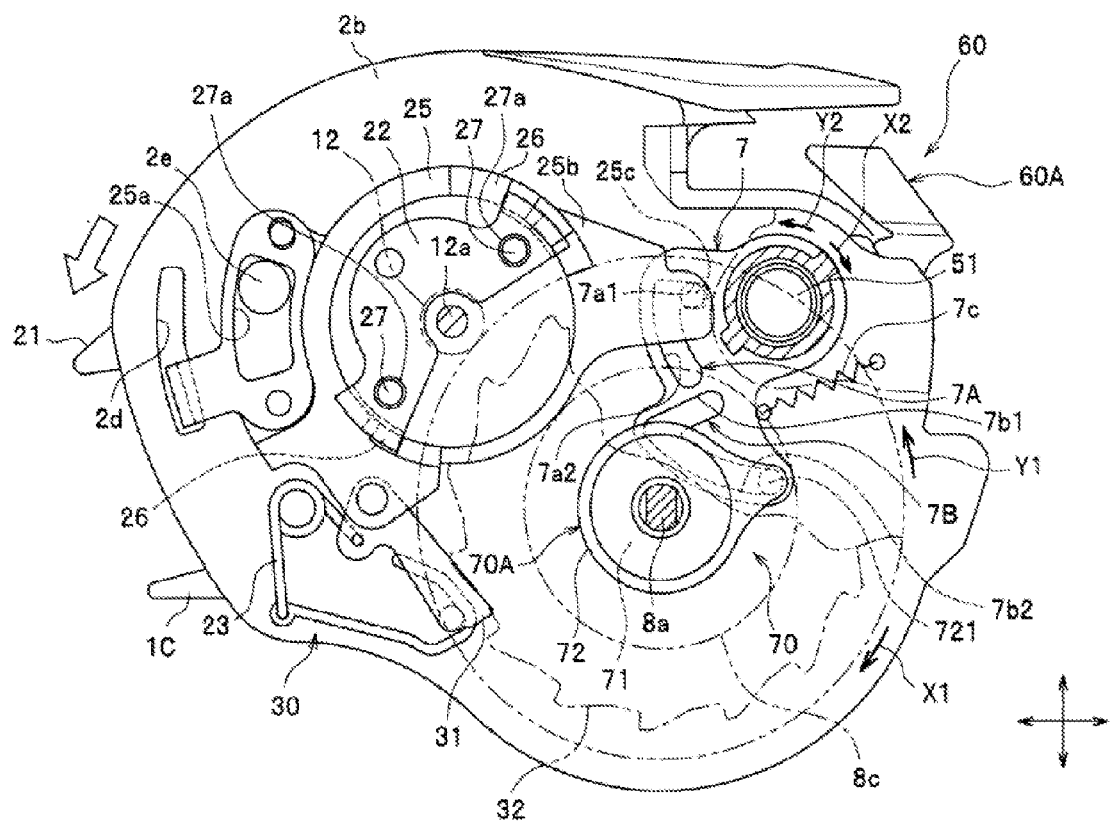
FIG. 20 is a side view of the force transmission portion of the clutch mechanism (clutch-Off state).
Figure 21:
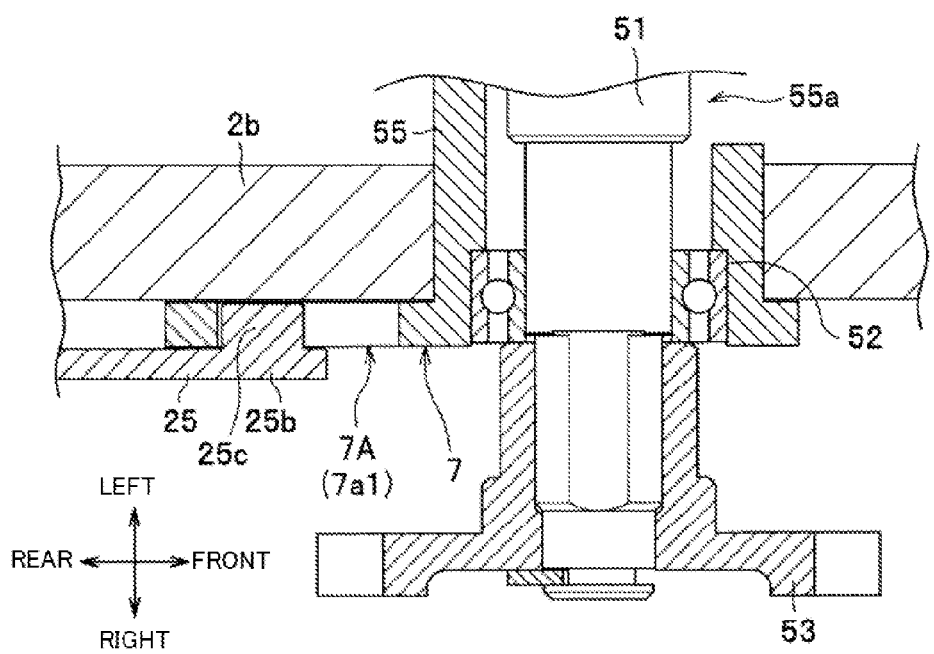
FIG. 21 is a sectional view showing a coupling portion between a clutch plate and a rotation plate rotating a fishing line guide.

Modification examples of the switch mechanism 70 will be described with reference to FIGS. 19 to 26. Referring to FIG. 21, a rotation plate 7 may be rotatably supported between the right frame 2b and the outer ring of the bearing 52 that rotatably supports the warm shaft 51. The rotation plate 7 may further extend along the outer peripheral surface of the right frame 2b toward the rear side and overlap with the projection 25b of the clutch plate 25 in the left-right direction. Referring to FIG. 19, the rotation plate 7 may have an upper engagement opening 7A and a lower engagement opening 7B formed in substantially L shapes as viewed from the lateral. The upper engagement opening 7A is used for transmitting a drive force of the clutch mechanism 20, and the lower engagement opening 7B is used for transmitting a drive force of the switch unit 70A and forms a part of the switch mechanism.

The upper engagement opening 7A includes a first upper long opening 7a1 and a second upper long opening 7a2 that is formed continuously with the first upper long opening 7a1. The first upper long opening 7a1 is formed as a linear long opening extending in the radial direction of the warm shaft 51. The second upper long opening 7a2 is formed as a long opening that has a circular arc shape concentric with the warm shaft 51.

The engaging projection 25c of the clutch plate 25 is loosely inserted in the upper engagement opening 7A. In this manner, the rotation plate 7 is rotated on the axial center of the warm shaft 51 in accordance with the rotation of the clutch plate 25 as shown in FIGS. 19 and 20. Thus, together with the clutch plate 25 switched between the fishing line winding state and the fishing line releasing state by the switch spring 23, the rotation plate 7 is also shifted between the two positions.

The lower engagement opening 7B may include a first lower long opening 7b1 and a second lower long opening 7b2 that is formed continuously with the first lower long opening 7b1. The first lower long opening 7b1 is formed as a linear long opening extending at a prescribed angle with the radial direction of the warm shaft 51, and the second lower long opening 7b2 is formed as a long opening that has a circular arc shape concentric with the warm shaft 51.

A projecting portion 721 is loosely inserted in the lower engagement opening 7B. The projecting portion 721 is disposed on the friction device 72 of the switch mechanism 70. Because the projecting portion 721 is loosely inserted, the rotation plate 7 is rotated in accordance with the rotation of the friction device 72. In other words, the rotation plate 7 is rotated by the operation of the switch mechanism 70 in addition to the rotation of the clutch plate 25 as described above.

A return spring 7c which is are turn means is provided between the front-side portion of the rotation plate 7 and the right frame 2b. The return spring 7c biases the rotation plate 7 in a counterclockwise direction and retains the rotation plate 7 in the fishing line winding state. The return spring 7c is a part of the switch mechanism With the return spring 7c, in the fishing line winding state as shown in FIG. 19, the engaging projection 25c of the clutch plate 25 is retained in a rear end portion of the first upper long opening 7a1 in the upper engagement opening 7A (an upper end portion of the second upper long opening 7a2). The projecting portion 721 of the switch mechanism 70 is retained in a rear end portion of the first lower long opening 7b1 in the lower engagement opening 7B (a rear end portion of the second lower long opening 7b2).

Whereas in the fishing line releasing state shown in FIG. 20, the engaging projection 25c of the clutch plate 25 is retained in a front end portion of the first upper long opening 7a1. The projecting portion 721 of the switch mechanism 70 is retained in a front end portion of the second lower long opening 7b2. The return spring 7c may also serve as one of the components of the switching mechanism 70, which will be hereunder described.

The switch mechanism 70 may include the switch unit 70A, the lower engagement opening 7B, and the return spring 7c as illustrated in FIGS. 19 and 20. The switch mechanism 70 may be disposed in a space between the warm shaft 51 (the drive shaft) of the level wind device 50 and the handle shaft 8a. The switch unit 70A may include a one-way device 71 and the friction device 72. The one-way device 71 and the friction device 72 may be coupled to each other and disposed in the right side plate 1B. In the present embodiment, the one-way device 71 and the friction device 72 are provided concentric with the handle shaft 8a.

Figure 23A:
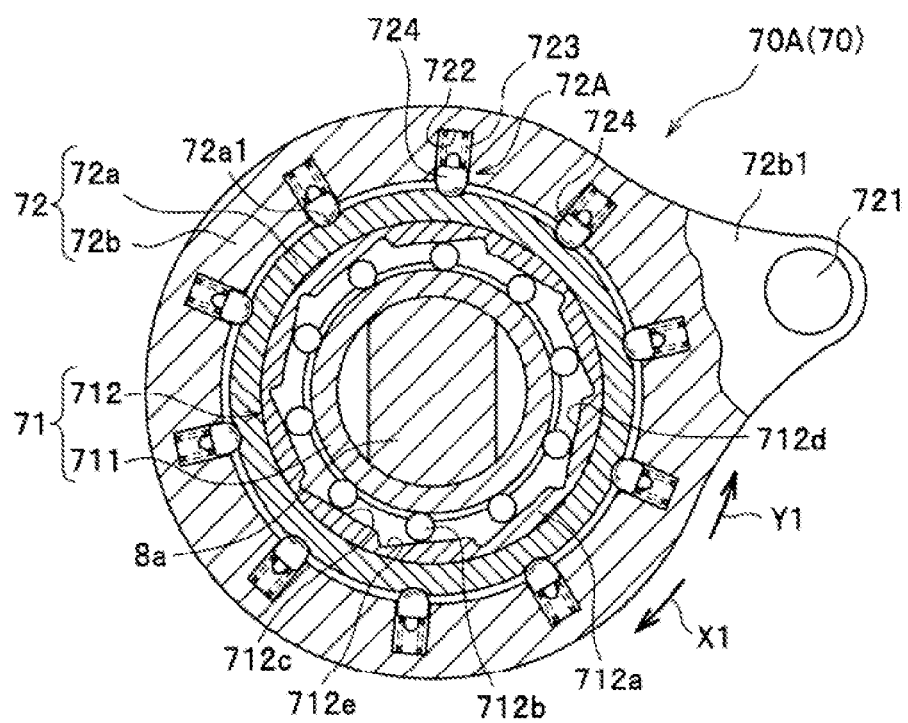
FIG. 23a is a partial sectional side view of the switch unit.
Figure 23B:
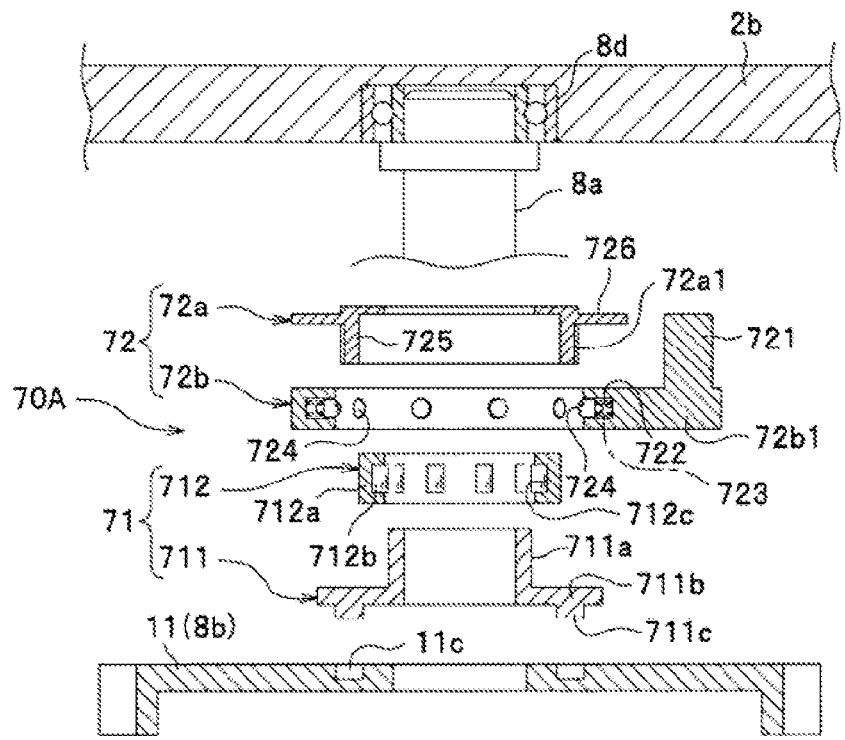
FIG. 23b is an exploded sectional view of the switch unit.
Figure 24A:
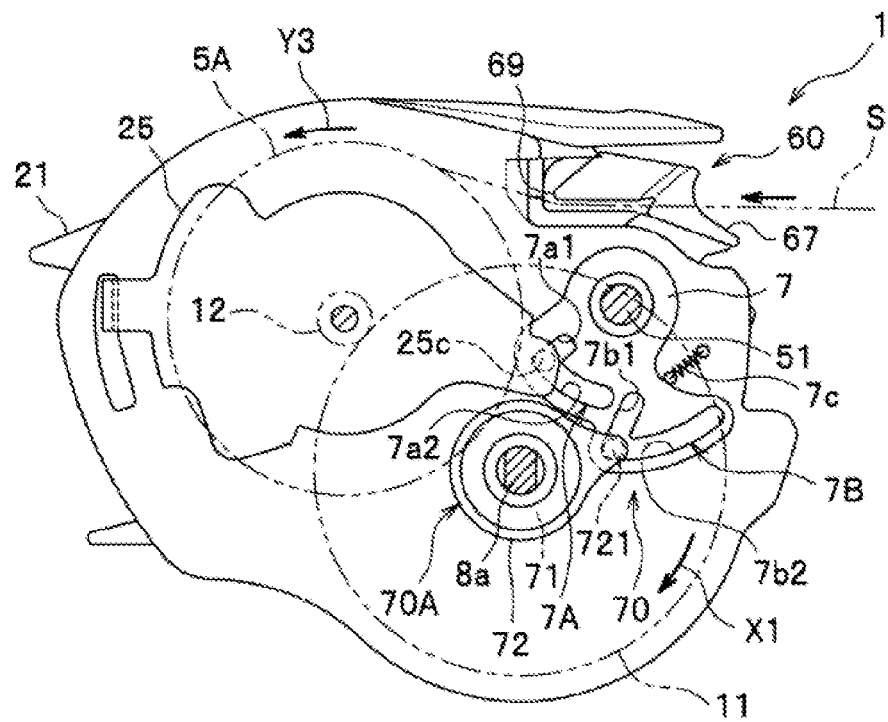
FIG. 24a is an explanatory drawing for the fishing line winding operation (clutch-On state).
Figure 24B:
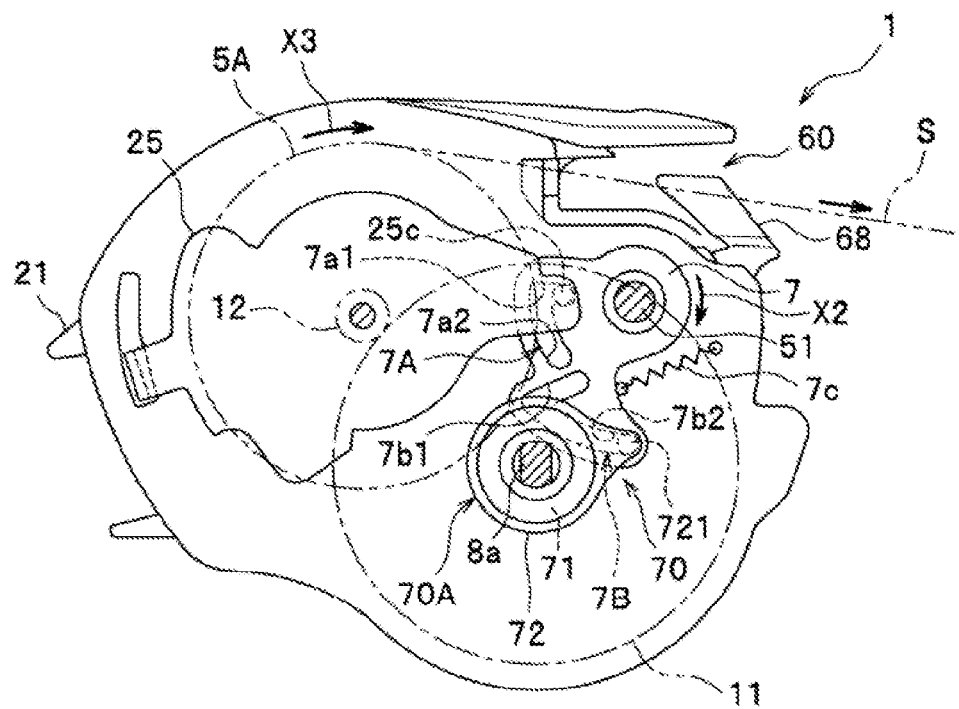
FIG. 24b is an explanatory drawing for the fishing line releasing operation (clutch-Off state).

Referring to FIGS. 23a and 23b, the one-way device 71 may include a drive gear collar 711 and the one-way clutch 712 supported by the drive gear collar 711. The one-way device 71 allows the drive gear collar 711 to be engaged with the one-way clutch 712 (switched to the drive force transmitting state) when the fishing line S is drawn out in the fishing line winding state and the drive gear 11 (see FIG. 23b) is rotated counterclockwise (in the direction indicated by the arrow Y1 shown in FIG. 23a) against a predetermined drag force of the drag device 8b (see FIG. 1). Moreover, the one-way device 71 allows the drive gear collar 711 to rotate freely (switched to an idle state) when the handle 8 is operated for winding and the drive gear 11 is rotated clockwise (in the direction indicated by the arrow X1 shown in FIG. 23a) via the drag device 8b (see FIG. 1).

Referring to FIG. 23b, the drive gear collar 711 may include a cylindrical portion 711a in which the handle shaft 8a is loosely inserted, an disc-shaped flange portion 711b disposed on a right end portion of the cylindrical portion 711a, and a plurality of protruding portions 711c provided on a right lateral surface of the flange portion 711b. The drive gear 11 may have a plurality of concave portions 11c in which the protruding portions 711c are respectively fitted. The drive gear 11 is unrotatably fixed on the drive gear collar 711.

The one-way clutch 712 may be a rolling type and may include a plurality of annular-shaped retainers 712a, and a plurality of rolling members (rollers) 712b retained by the retainer 712a in such a way that they can roll inside the retainer 712a. Referring to FIG. 23a, on a sloped surface 712c, provided are a free roll region 712e where the rolling members 712b are free to roll, and an inhibition surface 712d where rolling of the rolling members 712b are inhibited by a wedge effect. The one-way clutch 712 is pressed and unrotatably fixed in an input member 72a of the friction device 72.

When the handle 8 (see FIG. 1) is rotationally operated (winding operation) and the drive gear 11 is rotated clockwise (in the direction indicated by the arrow X1 in FIGS. 19 and 23), the rolling members 712b in the one-way device 71 are situated in the free roll region 712e and the drive gear collar 711 becomes free to rotate. In other words, the rotational force (drive force) input by the rotational operation of the handle 8 (see FIG. 1) is not output to the friction device 72.

(Because the reverse rotation of the handle shaft 8a at the time of releasing of the fishing line is prevented by the one-way clutch K,) when the fishing line S is drawn out against the drag force of the drag device 8b and the drive gear 11 is rotated counterclockwise (the direction indicated by the arrow Y1 in FIGS. 19 and 23), the rolling members 712b are situated on the inhibition surface 712d and the drive gear collar 711 and the retainer (outer ring) 712a are coupled to each other and rotate together. In this way, the rotational force (draw-out force) input through the drive gear 11 is output from the one-way device 71 to the friction device 72. As described above, the friction gear 72 is driven via the one-way gear 71 only when the fishing line S is drawn out against the drag force and the drive gear 11 rotates in the Y1 direction (counterclockwise) shown in FIGS. 19 and 23a.

Figure 22:
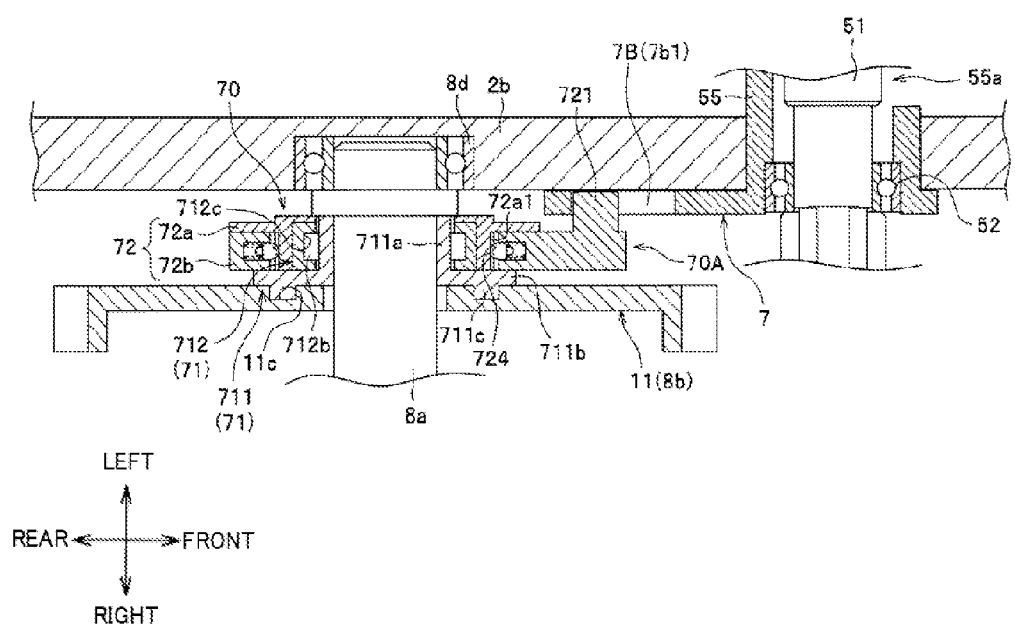
FIG. 22 is a sectional view showing a coupling portion between the rotation plate and a switch unit which is an essential part of the switch mechanism.

The friction device 72 may transmit the rotational force of the one-way device 71 to the rotation plate 7 in the downstream, and may be configured to slip if the friction gear is overloaded by a torque exceeding a prescribed torque. Referring to FIGS. 23a and 23b, the friction device 72 may include an annular input member 72a fixed on the outer surface of the retainer (outer ring) 712a of the one-way clutch 712, and an annular output member 72b fixed on the outer surface of the input member 72a, and a friction mechanism 72A (see FIG. 23a). The output member 72b may have an extension portion 72b1 extending toward the rotation plate 7 (see FIG. 19), and a projecting portion 721 is formed on a tip of the extension portion 72b1. The projecting portion 721 projects toward the right frame 2b (FIG. 23b) and is loosely inserted in the lower engagement opening 7B of the rotation plate 7 as shown in FIG. 22.

The friction mechanism 72A may include a concave portion 722 formed in the output member 72b, the biasing spring 723 housed within the concave portion 722, the engaging member 724 biased by the biasing spring 723, and an engagement receiving portion 72a1 disposed circumferentially on the outer peripheral surface of the input member 72a with a gap. The engaging member 724 may be configured to be pressed on the engagement receiving portion 72a1 and engaged therewith.

In this friction mechanism 72A, the engagement between the engaging member 724 and the engagement receiving portion 72a1 is released when a torque exceeding a prescribed torque is imposed, and the input member 72a and the output member 72b slip relative to each other. In other words, when a torque exceeding the prescribed torque acts between the input member 72a and the output member 72b, they slip relative to each other and the input member 72a continues to slip. Therefore, an excessive rotational force (drive force) will not be given to the rotation plate 7.

Figure 25A:
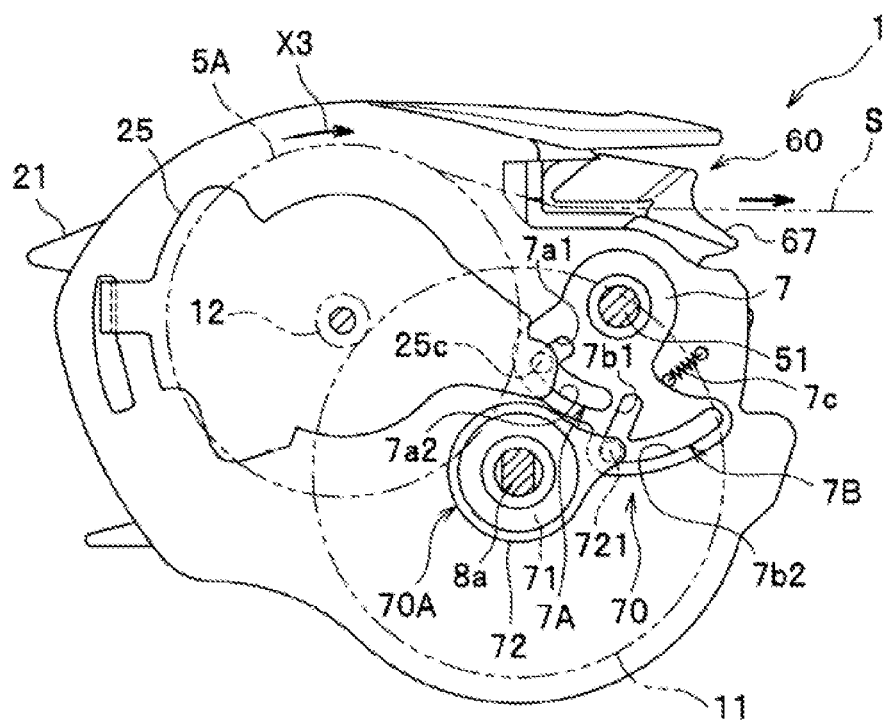
FIG. 25a illustrates a state where a fishing line is drawn out against a drag force when the fishing line is wound.
Figure 25B:
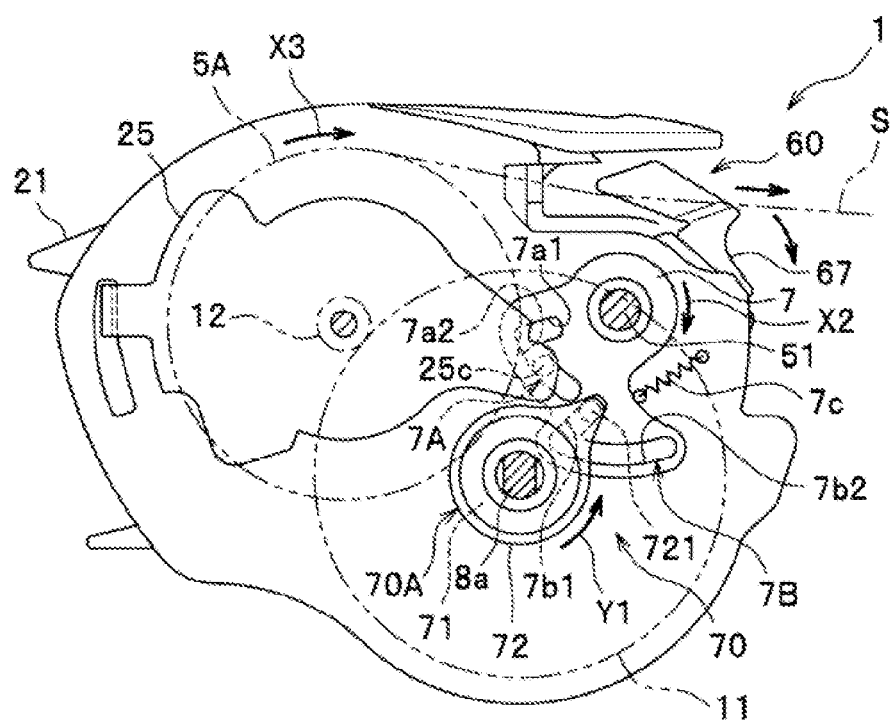
FIG. 25b illustrates a state where the fishing line guide is being rotated.

The friction device 72 is rotated in the direction (counterclockwise) indicated by the arrow Y1 shown in FIG. 25b by the rotational force generated by the retainer 712a of the one-way device 71, and thereby the rotation plate 7 in the downstream is rotated in the direction (clockwise) indicated by the arrow X2 shown in FIG. 25b. In this manner, the attitude of the fishing line guide 60 is switched from the fishing line winding state shown in FIG. 25a to the fishing line releasing state shown in FIG. 26a.

Operations when the fishing line S is drawn out in the clutch-On state will be now described. Referring to FIG. 25a, when the fishing line S is drawn out from the spool 5A against the drag force of the drag device 8b (see FIG. 1) in the clutch-On state, the rotational force (draw-out force) is transmitted from the spool shaft 5 to the drive gear 11 via the pinion 12 (see FIG. 26a, the spool 5A is rotated in the X3 direction and the drive gear 11 is rotated in the Y1 direction). The drive gear 11 is friction-engaged via the drag device 8b with the handle shaft 8a whose reverse rotation is prevented by the one-way clutch K (see FIG. 1), and the drive gear 11 rotates (drag-slips) in the direction (counterclockwise) indicated by the arrow Y1 shown in FIG. 25b. The drive gear collar 711 is then rotated in the direction (counterclockwise) indicated by the arrow Y1 shown in FIG. 23a. During the rotation of the drive gear collar in the Y1 direction, the drive gear collar 711 in the one-way device 71 rotates together with the retainer 712a due to the one-way clutch 712 so that the rotational force from the drive gear 11 is transmitted to the friction device 72 from the one-way device 71.

Accordingly, the input member 72a of the friction device 72 is rotated in the direction (counterclockwise) indicated by the arrow Y1 shown in FIG. 23a, and the output member 72b is rotated counterclockwise via the friction mechanism 72A. The rotation plate 7 is rotated via the projecting portion 721 in the direction (clockwise) indicated by the arrow X2 shown in FIG. 25b by the rotation of the output member 72b, thereby the fishing line guide 60 retained in the fishing line winding state is rotated clockwise on the warm shaft 51. In this manner, the attitude of the fishing line guide 60 is switched from the fishing line winding state to the fishing line releasing state (see FIG. 26a).

Figure 26A:
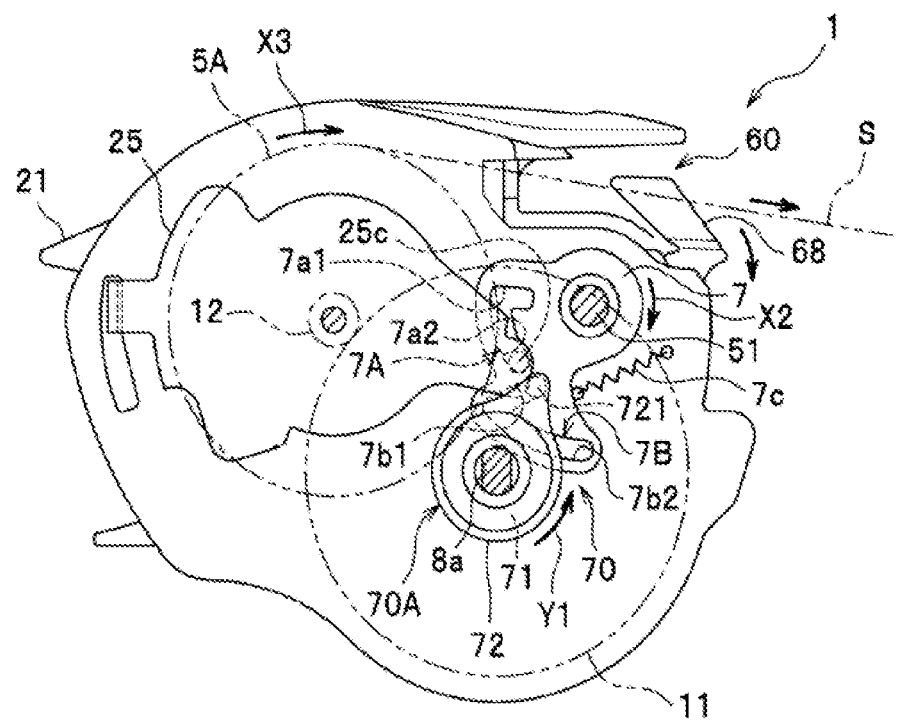
FIG. 26a illustrates a state where the fishing line is drawn out against a drag force and the fishing line guide is rotated to the fishing line releasing state.

In response to the attitude switch, the fishing line S inserted through the narrow guide portion 67 during winding is moved into the wide opening 68 as shown in FIG. 26a, and the fishing line S is drawn out through the wide opening 68. In the upper engagement opening 7A on the rotation plate 7, the second upper long opening 7a2 is formed in a circular arc shape concentric with the warm shaft 51. When the fishing line is drawn out, the engaging projection 25c of the clutch plate 25 is engaged in the second upper long opening 7a2 initially at the upper end portion of the opening (see FIG. 25a), and the rotation plate 7 is rotated until the engaging projection 25c is situated at the lower end portion of the second upper long opening 7a2 (see FIG. 26a). Therefore, the attitude of the fishing line guide 60 is switched (moved) from the fishing line winding state to the fishing line releasing state (FIG. 26a) in the clutch-On state without rotating the clutch plate 25.

When the fishing line S is continuously drawn out after the fishing line guide 60 is switched to the fishing line releasing state (see FIG. 26a) and a load exceeding a prescribed torque is worked on the friction device 72, the engagement between the input member 72a and the output member 72b shown in FIG. 23a is released, and the input member 72a and the output member 72b slip relative to each other. In this way, an excessive rotational force (drive force) would not be given to the rotation plate 7 while the fishing line guide 60 is maintained at the fishing line releasing state (see FIG. 26a).

Figure 26B:
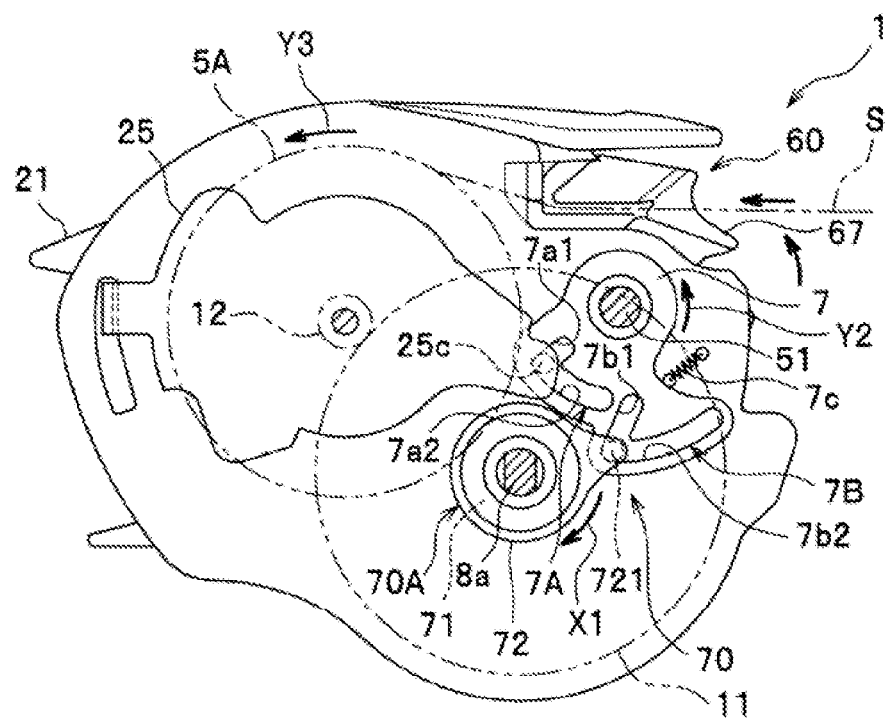
FIG. 26b illustrates a state where drawing of the fishing line has been stopped and the state is transitioned to the fishing line winding state.

When drawing out of the fishing line S against the drag force is stopped, the rotation plate 7 is rotated in the direction (counterclockwise) indicated by the arrow Y2 shown in FIG. 26b by the bias force of the return spring 7c as illustrated in FIG. 26b, and the fishing line guide 60 returns from the fishing line releasing state to the fishing line winding state. In other words, when the handle 8 is operated for winding after the drawing out of the fishing line S against the drag force has been stopped, the fishing line guide 60 returns to the fishing line winding state from the fishing line releasing state due to the action of the one-way clutch 712. In other words, the drive gear 11 is rotated in the direction indicated by the arrow X1 in FIG. 26*b* by the winding operation of the handle 8, thereby the drive gear collar 711 slips in the X1 direction (clockwise) to be in the idle state. In this manner, the rotation plate 7 is rotated in the direction (counterclockwise) indicated by the arrow Y2 by the bias force of the return spring 7*c*, and the fishing line guide 60 returns from the fishing line releasing state to the fishing line winding state.

If the fishing line S is drawn out from the spool 5A against the drag force of the drag device 8*b* (see FIG. 19) during winding of the fishing line, the fishing line guide 60 is rotated from the fishing line winding state to the fishing line releasing state due to the above-described mechanism. When the rotational force (draw-out force) to draw out the fishing line S from the spool 5A becomes smaller than the rotational force (wind-up rotational force) of the drive gear 11, the fishing line guide 60 then returns to the fishing line winding state from the fishing line releasing state due to the above-described mechanism.

According to the embodiment, the switch mechanism 70 is disposed by utilizing a space between the warm shaft 51 of the level wind device 50 and the handle shaft 8*a*, therefore it is possible to reduce the size of the device. This contributes to reduction in size of the fishing reel.

The switch mechanism 70 includes the one-way device 71 and the friction device 72 that are coupled to each other (disposed in a concentric fashion) within one of the side plates (the right side plate 1B) so that the drive mechanism to drive the fishing line guide 60 can be concentrated therein. Consequently it is possible to simplify the structure and reduce the size of the drive mechanism. Moreover, it is possible to transmit the rotational force of the one-way device 71 effectively to the friction device 72 and to stabilize the rotational movement of the fishing line guide 60.

Furthermore, because the one-way device 71 and the friction device 72 are disposed on the handle shaft 8*a*, the drive mechanism is concentrated on the handle shaft 8*a* and it is possible to further simplify the structure and reduce the size of the drive mechanism. In addition, because the drive mechanism is concentrated on the handle shaft 8*a*, interferences with other components can be adequately avoided. Moreover, it is possible to improve the arrangements of the components.

Fifth Embodiment

Figure 27A:
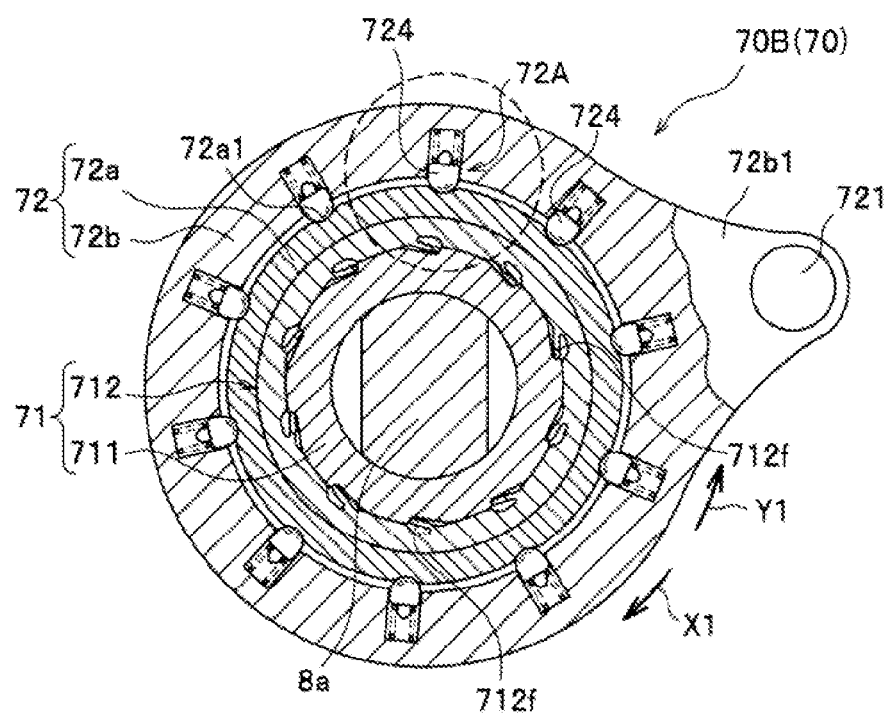
FIG. 27a is a partial sectional side view of the switch unit.

Next, the fifth embodiment of the fishing reel will now be described with reference to FIGS. 27 and 28. The fourth embodiment has the basically the same structure as the first to third embodiments except that the one-way device 71 in the switch unit 70B is simplified in the fourth embodiment. The structures of the rotation plate 7 and other components are same as those of the fourth embodiment.

Figure 27B:
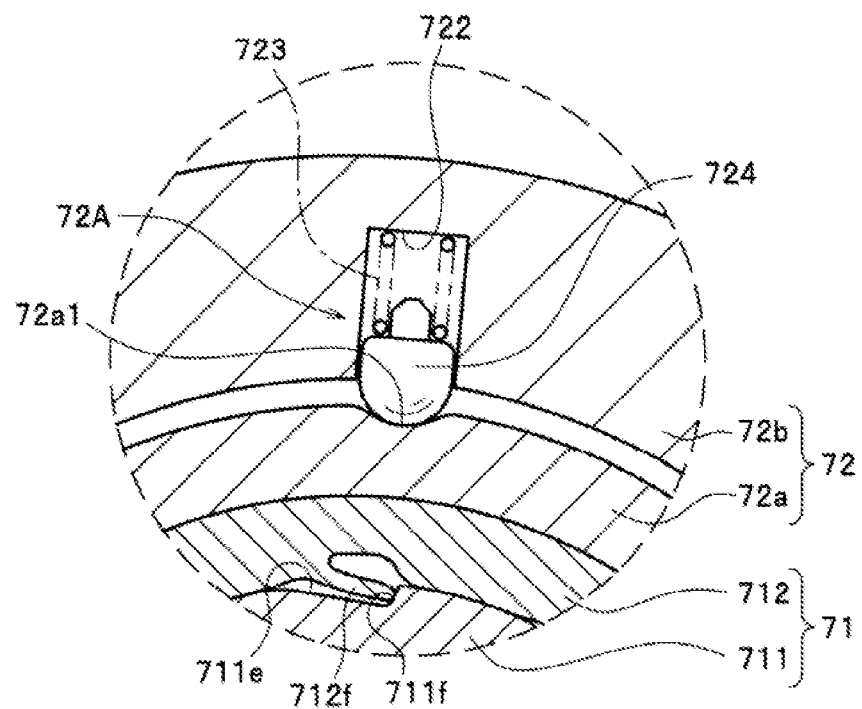
FIG. 27b is an enlarged sectional view of essential parts of the switch unit.
Figure 28:
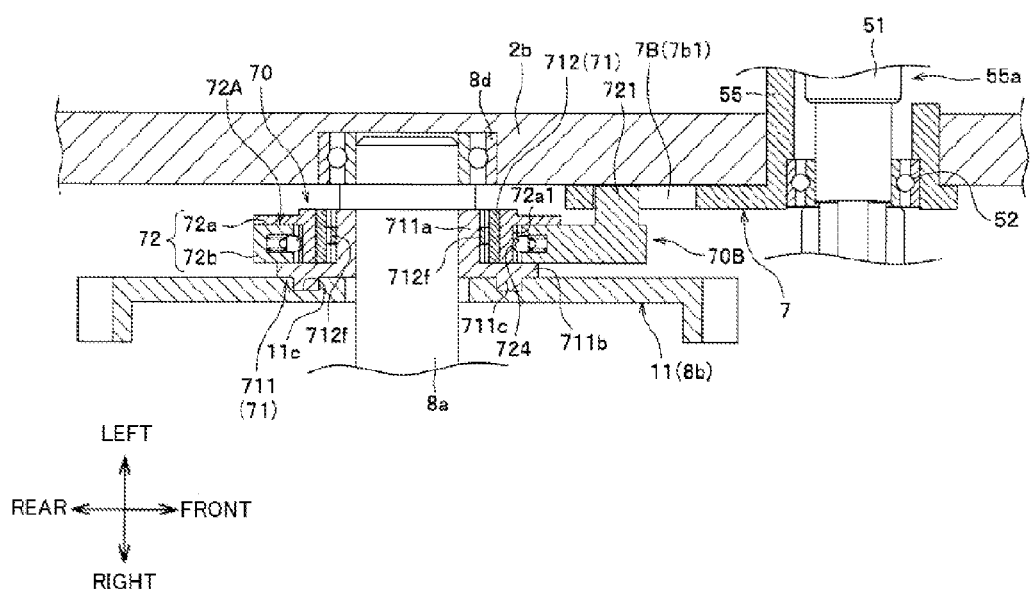
FIG. 28 is a sectional view showing a coupling portion between the rotation plate and the switch unit.

Referring to FIGS. 27 and 28, the one-way clutch 712 may include a plurality of lips 712*f* extending circumferentially. The drive gear collar 711 may have engaging concave portions 711*e* corresponding to the lips 712*f* with an interval therebetween along the outer peripheral surface of the collar. The engaging concave portion 711*e* is sloped in the direction in which the lip 712*f* extends (sloped toward the center in the radial direction) and has a depth which can at least house a tip portion of the lip 712*f*. A step surface 711*f* on which the tip portion of the lip 712*f* is locked is formed at an end of the engaging concave portion 711*e*.

When the handle 8 (see FIG. 1) is rotationally operated (winding operation) and the drive gear 11 is rotated clockwise (in the direction indicated by the arrow X1 in FIGS. 19 and 27*a*), the lip 712*f* in the one-way device 71 is disengaged from the engaging concave portion 711*e* and the drive gear collar 711 becomes free to rotate. In other words, the rotational force (drive force) input by the rotational operation of the handle 8 (see FIG. 1) is not output to the friction device 72.

When the fishing line S is drawn out against the drag force of the drag device 8*b* (see FIG. 1) and the drive gear 11 rotates counterclockwise (the direction indicated by the arrow Y1 in FIGS. 19 and 27*a*), each lip 712*f* is locked on the step surface 711*f*, and the drive gear collar 711 and the one-way clutch 712 are coupled to each other and rotated together. In this way, the rotational force (draw-out force) input through the drive gear 11 is output from the one-way device 71 to the friction device 72, as described above, the friction gear 72 is driven via the one-way device 71 only when the fishing line S is drawn out against the drag force and the drive gear 11 rotates in the Y1 direction (counterclockwise) shown in FIGS. 19 and 27*a*.

The above-described fifth embodiment can also obtain the same advantageous effects as those of the fourth embodiment. Moreover, because the structure of the one-way device 71 is simplified, it is possible to reduce the manufacturing cost. In addition, it is possible to reduce the size of the switch unit 70A.

Embodiments of the present invention are not limited to the above descriptions and are susceptible to various modifications. For instance, the position to which the fishing line S is guided is changed by the fishing line guide 60 that rotates to change its attitude in the above-described embodiments, however, other configuration is possible. For example, the fishing line S may be guided to the narrow guide portion 67 or the wide opening portion 68 by the fishing lien guide 60 that moves linearly (in the upper-lower direction or the like).

The friction mechanism 722 of the friction gear 72 may be configured from a mechanism using a viscous fluid.

The shape of the fishing line guide 60 can be adequately changed. For example, the wide opening portion 68 may be formed in a substantially triangle shape, a substantially circular shape or the like. Although the control portion 69 is formed from the rear edge of the upper wall 68*b* of the flat frame body 60F in the above-described embodiments, the shape of the control portion 69 may be adequately modified. For example, a part of the frame body 60F that forms the fishing line insertion portion 60A can be bent to form the control portion.

Moreover, a material (a fishing line contact member) having abrasion resistance and a small sliding resistance may be provided on a portion of the fishing line guide 60 where the fishing line contacts with. When this kind of the fishing line contact member is provided, it is possible to prevent the fishing line S being broke when the fishing line contacts there at the time of winding and releasing of the fishing line. In addition, it is possible to further reduce the contact resistance.

Although the fishing line guide 60 is configured to rotate in conjunction with the clutch mechanism 20 in the above-described embodiments, the fishing line guide 60 may be configured to rotate independently from the clutch mechanism 20. Moreover, although the fishing line guide 60 is unrotatably supported by the protrusion extending in the axial direction, it may be unrotatably supported by an edge 55e of the long opening

What is claimed is:

1. A fishing reel, comprising:
   a spool rotatably supported by a reel body;
   a fishing line guide through which a fishing line is inserted;
   a level wind device causing the fishing line guide to reciprocate in a left-right direction to guide the fishing line onto the spool;
   a drag device imparting a drag force on the fishing line; and
   a switch mechanism for switching attitude of the fishing line guide,
   wherein the fishing line guide includes a narrow guide portion and a wide opening, the fishing line guide being configured such that the fishing line is situated in the narrow guide portion while the fishing line is wound around the spool and the fishing line is situated in the wide opening while the fishing line is released from the spool; and
   wherein the attitude of the fishing line guide is switched by the switch mechanism in such a way that a position where the fishing line is situated is changed from the narrow guide portion to the wide opening when the fishing line is drawn out against the drag force of the drag device at the time of winding of the fishing line around the spool.

2. The fishing reel of claim 1, wherein the switch mechanism is disposed in a force transmission path from a drive gear that is friction-engaged with a handle shaft to the level wind device that reciprocates in the left-right direction in conjunction with rotation of the drive gear.

3. The fishing reel of claim 1, wherein the switch mechanism includes a one-way device and a friction device.

4. The fishing reel of claim 3, wherein the switch mechanism further includes an engaging means and a return means.

5. The fishing reel of claim 3, wherein the one-way device is a one-way gear that transmits force when the fishing line is drawn out against the drag force generated by the drag device, and the friction device is a friction gear that slips when a load exceeding a prescribed torque works thereon.

6. The fishing reel of claim 3, wherein the one-way device and the friction device are coupled to each other within one of the side panels.

7. The fishing reel of claim 3, wherein the one-way device and the friction device are disposed on a handle shaft.

8. The fishing reel of claim 1, wherein at least a part of the switch mechanism is disposed between a drive shaft of the level wind device and a rotator of the drag device.

9. The fishing reel of claim 1 further comprising:
   a clutch mechanism switching the spool between a drive force transmitting state and an idle state,
   wherein the fishing line guide is configured to cause the fishing line to be situated in the narrow guide portion when the fishing line guide is switched to the drive force transmitting state by the clutch mechanism and cause the fishing line to be situated in the wide opening when the fishing line guide is switched to the idle state by the clutch mechanism.

* * * * *